US011415794B2

(12) United States Patent
Gao et al.

(10) Patent No.: US 11,415,794 B2
(45) Date of Patent: *Aug. 16, 2022

(54) LOW-OBLIQUITY PUPIL RELAY FOR NEAR-EYE DISPLAY

(71) Applicant: Facebook Technologies, LLC, Menlo Park, CA (US)

(72) Inventors: Weichuan Gao, Redmond, WA (US); Brian Wheelwright, Sammamish, WA (US); Babak Amirsolaimani, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 380 days.

This patent is subject to a terminal disclaimer.

(21) Appl. No.: 16/592,163

(22) Filed: Oct. 3, 2019

(65) Prior Publication Data
US 2021/0103140 A1    Apr. 8, 2021

(51) Int. Cl.
*G02B 26/12*   (2006.01)
*G01S 7/481*   (2006.01)
(Continued)

(52) U.S. Cl.
CPC .......... *G02B 26/123* (2013.01); *G01S 7/4817* (2013.01); *G02B 27/0172* (2013.01);
(Continued)

(58) Field of Classification Search
CPC ............. G02B 27/0172; G02B 27/283; G02B 27/0081; G02B 2027/0178; G02B 5/3083;
(Continued)

(56) References Cited

U.S. PATENT DOCUMENTS 9,523,852 B1   12/2016  Brown et al.
9,971,150 B1 *  5/2018  Robbins ............... G02B 26/101
(Continued)

FOREIGN PATENT DOCUMENTS

WO   WO-2005076869 A2 *  8/2005  ............ G02B 23/14
WO       2019111237         6/2019

OTHER PUBLICATIONS

PCT/US2020/049072 Search Report dated Nov. 5, 2020.
(Continued)

*Primary Examiner* — Joseph P Martinez
*Assistant Examiner* — Vipin Patel
(74) *Attorney, Agent, or Firm* — Pequignot + Myers; Matthew A. Pequignot

(57) ABSTRACT

A beam scanner for a near-eye display includes a beam-folded pupil relay configured for receiving a light beam reflected from a tiltable reflector and relaying the light beam to an exit pupil while preserving the beam angle of the reflected beam. The beam-folding pupil relay includes a beamsplitter, e.g. a polarization beam splitter configured to redirect the beam to a curved reflector, which sends the beam towards the exit pupil. Polarization of the light beam reflected from the curved reflector may be changed to an orthogonal polarization by a waveplate disposed in an optical path of the light beam between the polarization beam splitter and the curved reflector, enabling the reflected light beam to propagate through the polarization beam splitter towards the exit pupil. A pupil-replicating waveguide may be disposed proximate the exit pupil. A 2D tiltable reflector or a pair of 1D tiltable reflectors may be used.

17 Claims, 14 Drawing Sheets

(51) Int. Cl.
*G02B 27/01* (2006.01)
*G02B 27/28* (2006.01)
*G02B 17/02* (2006.01)
*G02B 26/10* (2006.01)
*G03B 21/28* (2006.01)

(52) U.S. Cl.
CPC .......... *G02B 27/283* (2013.01); *G02B 17/023* (2013.01); *G02B 26/101* (2013.01); *G02B 26/126* (2013.01); *G03B 21/28* (2013.01)

(58) Field of Classification Search
CPC .. G02B 26/101; G02B 26/10; G02B 17/0856; G02B 2027/0187; G02B 26/0833; G02B 26/105; G02B 27/017; G02B 5/10; G02B 2027/011; G02B 2027/013; G02B 26/123; G02B 27/286; G02B 27/30; G02B 5/3058; G02B 17/023; G02B 2027/0125; G02B 2027/0138; G02B 2027/014; G02B 26/126; G02B 27/0075; G02B 27/0093; G02B 27/18; G02B 9/06; G01S 7/4817; H04N 13/344; H04N 9/3111; H04N 9/3132; H04N 9/3161; G02C 11/00; G02C 11/10; G03B 21/28; G03B 13/00; G09G 3/02; G09G 3/2003; G09G 1/00; G09G 3/00; G09G 2230/00; G09G 2300/00; G09G 2290/00; G09G 2310/00; G09G 2320/00; G09G 2330/00; G09G 2340/00; G09G 2350/00; G09G 2352/00; G09G 2354/00; G09G 2356/00; G09G 2358/00; G09G 2360/00; G09G 2380/00
See application file for complete search history.

(56) References Cited

U.S. PATENT DOCUMENTS

| | | | |
|---|---|---|---|
| 11,280,997 B1* | 3/2022 | Gao | G02B 26/101 |
| 2004/0172599 A1 | 9/2004 | Dietrich | |
| 2004/0174599 A1* | 9/2004 | Dietrich | G02B 27/0172 359/489.08 |
| 2011/0134017 A1 | 6/2011 | Burke | |
| 2018/0017783 A1* | 1/2018 | Ji | G02B 26/105 |
| 2018/0120559 A1 | 5/2018 | Yeoh et al. | |
| 2018/0149862 A1* | 5/2018 | Kessler | G02B 27/0081 |

OTHER PUBLICATIONS

Lee et al. "Optical properties of reflective liquid crystal polarization vol. gratings" vol. 36, No. 5 / May 2019 / Journal of the Optical Society of America B.

International Preliminary Report on Patentability for International Application No. PCT/US2020/049072, dated Apr. 14, 2022, 9 pages.

* cited by examiner

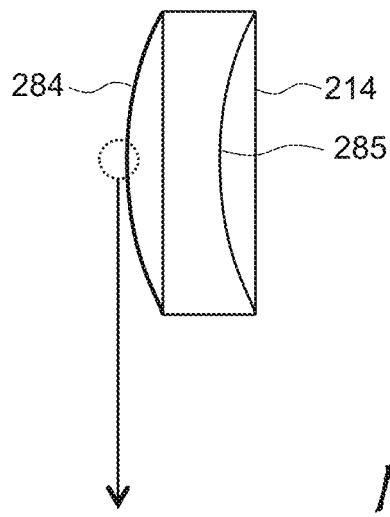
FIG. 2D
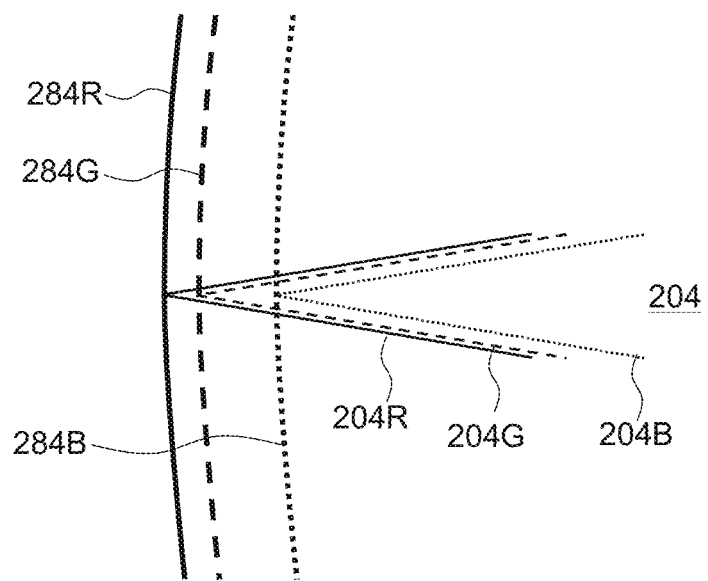

LOW-OBLIQUITY PUPIL RELAY FOR NEAR-EYE DISPLAY

TECHNICAL FIELD

The present disclosure relates to wearable headsets, and in particular to components and modules for wearable visual display headsets.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) by providing individual images to each eye of the user. Eye position and gaze direction, and/or orientation of the user may be tracked in real time, and the displayed imagery may be dynamically adjusted depending on the user's head orientation and gaze direction, to match virtual objects to real objects observed by the user, and generally to provide an experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user directly, without an intermediate screen or a display panel. A waveguide may be used to carry the image in angular domain to the user's eye. The lack of a screen or high numerical aperture collimating optics in a scanning projector display enables size and weight reduction of the display. A scanner for a projector display needs to be fast, have a wide scanning range, and preserve the optical quality of the beam being scanned to form an image in angular domain.

BRIEF DESCRIPTION OF THE DRAWINGS

Exemplary embodiments will now be described in conjunction with the drawings, in which:

FIG. 2D is a ray-traced cross-sectional view of a curved reflector embodiment with chromatic aberration compensation;

DETAILED DESCRIPTION

Figure 1:
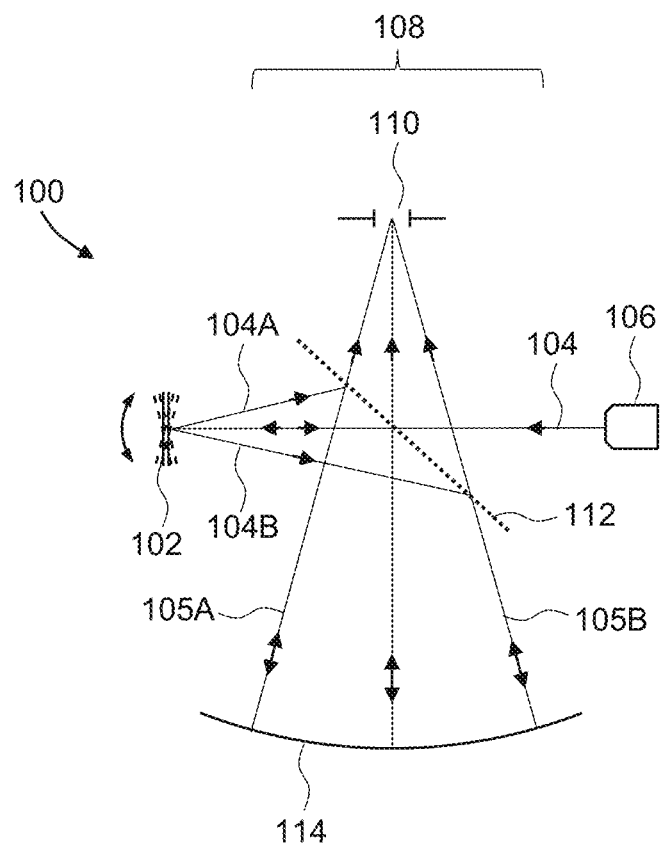
FIG. 1 is a schematic view of a beam scanner of this disclosure, the beam scanner including a beam-folded pupil relay and a 2D tiltable reflector.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2A-2C, FIG. 3, and FIG. 5, similar reference numerals denote similar elements.

A tiltable reflector may be used to scan a light beam emitted by a light source to form an image in angular domain for observation by a user of a near-eye display. As the light beam is scanned, the brightness and/or color of the scanned light beam are varied in coordination with the scanning, in accordance with corresponding pixels of the image to be displayed. The entire image is formed when the light beam is scanned in two dimensions, e.g. over X- and Y-viewing angles, over the entire frame or field of view (FOV) of the display. When the frame rate is high enough, the eye integrates the scanned light beam, enabling the user to see the displayed imagery substantially without flicker.

One challenge associated with some near-eye display image scanners is reduction of field of view (FOV) caused by an oblique angle of incidence of the light beam onto a tiltable reflector of the scanner. The oblique angle may be required by the optical geometry used, e.g. to physically separate an impinging light beam from the scanned, i.e. reflected, light beam. The FOV reduction is caused by distortion of the solid angle representing the range of scanning at oblique angles of incidence of light beam at the tiltable reflector.

A scanned light beam may be coupled to an input grating of a pupil-replicating waveguide. The function of the input grating is to couple the impinging light beam to propagate in the waveguide, e.g. by total internal reflection (TIR). Another challenge associated with some near-eye display image scanners is that the light beam shifts along the input grating as it is scanned, which requires the size of the input grating to be increased to capture the scanned light beam at the extreme scanning angles. Unfortunately, light redirected by a large input grating may impinge on the input grating several times as it propagates by TIR inside the waveguide, causing power loss and brightness loss and worsening a modulation transfer function (MTF) of the image being displayed to the user.

In accordance with the present disclosure, a pupil relay may be used to compensate for the scanned beam travel, such that regardless of the beam angle, the beam always propagates through a same location at an exit pupil of the pupil relay, albeit at different angles. The output light beam of the pupil relay may be spatially separated from the input light beam by polarization. This obviates the need in geometrical separation of the beams by oblique angles of incidence, resulting in a compact configuration providing a nearly straight angle of incidence at the tiltable reflector when the latter is in a center (non-tilted) angular position. Low obliquity of the impinging light beam enables the scanning range to be utilized more efficiently. At the same time, a reduced beam walk enables one to reduce the size of the input grating of a pupil-replicating waveguide, thus improving the image MTF.

In accordance with the present disclosure, there is provided a beam scanner comprising a first tiltable reflector for receiving a first light beam from a light source and reflecting the first light beam at a variable angle. A beam-folded pupil relay is configured for receiving the first light beam from the first tiltable reflector and relaying the first light beam to an exit pupil. The beam-folded pupil relay comprises a beamsplitter configured for receiving the first light beam reflected by the first tiltable reflector and reflecting at least a portion of the first light beam, and a curved reflector configured for receiving the portion of the first light beam reflected by the beamsplitter, and for reflecting the portion of the first light beam back towards the beamsplitter. The beamsplitter is configured to transmit at least a portion of the portion of the first light beam reflected by the curved reflector to the exit pupil of the beam-folded pupil relay.

In some embodiments, the curved reflector has a radius of curvature substantially equal to an optical path length from the first tiltable reflector to the curved reflector, and to an optical path length from the curved reflector to the exit pupil. In some embodiments, the beamsplitter comprises a polarization beamsplitter (PBS) configured to reflect light having a first polarization state and to transmit light having a second polarization state orthogonal to the first polarization state, wherein the first light beam reflected from the tiltable reflector and impinging onto the PBS has the first polarization state. The beam scanner may further include a first quarter-wave waveplate (QWP) disposed in an optical path between the PBS and the curved reflector and configured to convert polarization of the first light beam upon double pass through the first QWP from the first polarization state to the second polarization state, whereby in operation, the first light beam reflected by the curved reflector propagates through the PBS. The beam scanner may further include a first lens in an optical path between the first tiltable reflector and the PBS, for focusing the first light beam reflected by the first tiltable reflector to propagate towards the PBS; a second lens in an optical path between the PBS and the exit pupil, for collimating the first light beam propagated through the PBS; and a second QWP in an optical path between the first tiltable reflector and the PBS. In operation, the first light beam emitted by the light source has the second polarization state and propagates through the PBS before impinging onto the first tiltable reflector. The PBS may have a shape of a cuboid with two square faces and four rectangular, i.e. non-square faces.

In some embodiments, the first tiltable reflector comprises a 2D tiltable microelectromechanical system (MEMS) reflector. In some embodiments, the first tiltable reflector comprises a 1D tiltable MEMS reflector for scanning the first light beam along a first direction. The beam scanner may further include a second tiltable MEMS reflector comprising an 1D tiltable MEMS reflector disposed proximate the exit pupil for receiving the first light beam propagated through the beamsplitter and scanning the first light beam along a second direction non-parallel to the first direction. The curved reflector may include a meniscus lens having a reflective coating on its distal convex surface.

In some embodiments, the beam scanner includes a beam-folding prismatic element and a QWP. The beam-folding prismatic element may be disposed in an optical path between the first tiltable reflector and the beamsplitter, the beam-folding prismatic element comprising first and second adjacent surfaces and a first reflective polarizer at the first surface. The beam-folding prismatic element may be configured to reflect the first light beam emitted by the light source at least twice from within the beam-folding prismatic element, including one reflection from the first reflective polarizer, before redirecting the first light beam out of the beam-folding prismatic element through the second surface and towards the first tiltable reflector. The QWP may be configured for receiving and propagating therethrough the first light beam exiting the beam-folding prismatic element. In operation, the first light beam propagated through the QWP after reflection from the tiltable reflector propagates through the beam-folding prismatic element. A second prismatic element may be provided for propagating therethrough the first light beam outputted by the beam-folding prismatic element, the second prismatic element adjoining the first reflective polarizer.

In some embodiments, the beam-folding prismatic element further comprises a second reflective polarizer disposed within the beam-folding prismatic element in an optical path of the first light beam between reflections from the second and first surfaces within the beam-folding prismatic element. The QWP may be optically coupled to a third surface of the beam-folding prismatic element. In operation, the first light beam undergoes a first reflection from the second surface, propagates through the second reflective polarizer, undergoes a second reflection from the third surface through the QWP, is reflected by the first reflective polarizer, exits the beam-folding prismatic element at its third surface through the QWP, is reflected by the tiltable reflector to propagate back through the QWP, thorough the second reflective polarizer, and out of the beam-folding prismatic element. A second prismatic element may be coupled to the first surface of the beam-folding prismatic element, for receiving a second light beam impinging on the second prismatic element, and for coupling the second light beam to the beam-folding prismatic element through the first reflective polarizer.

In accordance with the present disclosure, there is provided a projector comprising a first light source for providing a first light beam, a first tiltable reflector for receiving the first light beam from the light source and reflecting the first light beam at a variable angle, and a beam-folded pupil relay configured for receiving the first light beam from the first tiltable reflector and relaying the first light beam to an exit pupil. The beam-folded pupil relay may include a beamsplitter configured for receiving the first light beam reflected by the first tiltable reflector and reflecting at least a portion of the first light beam, and a curved reflector configured for receiving the portion of the first light beam reflected by the beamsplitter, and for reflecting the portion of the first light beam back towards the beamsplitter. The beamsplitter may be configured to transmit at least a portion of the portion of the first light beam reflected by the curved reflector to the exit pupil of the beam-folded pupil relay.

In embodiments where the beamsplitter comprises a polarization beamsplitter (PBS) configured to reflect light having a first polarization state and to transmit light having a second polarization state orthogonal to the first polarization state, the projector may further include a first lens in an optical path between the first tiltable reflector and the PBS, for focusing the first light beam reflected by the first tiltable reflector to propagate towards the PBS; a second lens in an optical path between the PBS and the exit pupil, for collimating the first light beam propagated through the PBS; a first quarter-wave waveplate (QWP) disposed in an optical path between the PBS and the curved reflector and configured to convert polarization of the first light beam upon double pass through the first QWP from the first polarization state to the second polarization state. In operation, the first light beam reflected by the curved reflector propagates through the PBS; and a second QWP in an optical path between the first tiltable reflector and the PBS. The first light beam emitted by the light source has the second polarization state and propagates through the PBS before impinging onto the first tiltable reflector.

The first tiltable reflector may include a 1D tiltable MEMS reflector for scanning the first light beam along a first direction. The projector may further include a second tiltable MEMS reflector comprising an 1D tiltable MEMS reflector disposed proximate the exit pupil for receiving the first light beam propagated through the beamsplitter and scanning the first light beam along a second direction non-parallel to the first direction.

In some embodiments, the projector further includes a beam-folding prismatic element in an optical path between the first tiltable reflector and the beamsplitter, the beam-folding prismatic element comprising first and second adjacent surfaces and a first reflective polarizer at the first surface, wherein the beam-folding prismatic element is configured to reflect the first light beam emitted by the light source at least twice from within the beam-folding prismatic element, including one reflection from the first reflective polarizer, before redirecting the first light beam out of the beam-folding prismatic element through the second surface and towards the first tiltable reflector, and a beam-folding prismatic element in an optical path between the first tiltable reflector and the beamsplitter, the beam-folding prismatic element comprising first and second adjacent surfaces and a first reflective polarizer at the first surface, wherein the beam-folding prismatic element is configured to reflect the first light beam emitted by the light source at least twice from within the beam-folding prismatic element, including one reflection from the first reflective polarizer, before redirecting the first light beam out of the beam-folding prismatic element through the second surface and towards the first tiltable reflector. In operation, the first light beam propagated through the QWP after reflection from the tiltable reflector propagates through the beam-folding prismatic element.

In some embodiments, the projector further includes a second light source for providing a second light beam, and a second prismatic element coupled to the first surface of the beam-folding prismatic element, for receiving the second light beam impinging on the second prismatic element, and for coupling the second light beam to the beam-folding prismatic element through the first reflective polarizer. The beam-folding prismatic element may further include a second reflective polarizer disposed within the beam-folding prismatic element in an optical path of the first light beam between reflections from the second and first surfaces within the beam-folding prismatic element, and wherein the QWP is optically coupled to a third surface of the beam-folding prismatic element. In operation, the first light beam undergoes a first reflection from the second surface, propagates through the second reflective polarizer, undergoes a second reflection from the third surface through the QWP, is reflected by the first reflective polarizer, exits the beam-folding prismatic element at its third surface through the QWP, is reflected by the tiltable reflector to propagate back through the QWP, thorough the second reflective polarizer, and out of the beam-folding prismatic element.

In accordance with the present disclosure, there is further provided a near-eye display for providing an image in angular domain at an eyebox. The near-eye display includes a first light source for providing a first light beam; a first tiltable reflector for receiving the first light beam from the light source and reflecting the first light beam at a variable angle; and a beam-folded pupil relay configured for receiving the first light beam from the first tiltable reflector and relaying the first light beam to an exit pupil. The beam-folded pupil relay may include a beamsplitter configured for receiving the first light beam reflected by the first tiltable reflector and reflecting at least a portion of the first light beam, and a curved reflector configured for receiving the portion of the first light beam reflected by the beamsplitter, and for reflecting the portion of the first light beam back towards the beamsplitter. The beamsplitter may be configured to transmit at least a portion of the portion of the first light beam reflected by the curved reflector to the exit pupil of the beam-folded pupil relay. The projector may further include a pupil-replicating waveguide disposed proximate the exit pupil of the beam-folded pupil relay, and a controller operably coupled to the first light source and the first tiltable reflector. The controller may be configured to operate the first tiltable reflector to cause the portion of the portion of the first light beam at the exit pupil of the beam-folded pupil relay to have a beam angle corresponding to a first pixel of an image to be displayed; and operate the first light source in coordination with operating the tiltable reflector, such that the first light beam has brightness corresponding to the first pixel.

In embodiments where the first tiltable reflector comprises a 1D tiltable MEMS reflector for scanning the first light beam along a first direction, the near-eye display may further include a second tiltable MEMS reflector comprising an 1D tiltable MEMS reflector disposed proximate the exit pupil for receiving the first light beam propagated through the beamsplitter and scanning the first light beam along a second direction non-parallel to the first direction. In such embodiments, the pupil-replicating waveguide may include a polarization volume grating (PVH) configured to receive the light beam reflected by the second tiltable reflector and redirect the light beam for propagation in the pupil-replicating waveguide. The controller may be operably coupled to the second tiltable reflector and configured to operate the second tiltable reflector to cause the first light beam at the exit pupil of the beam-folded pupil relay to have a beam angle corresponding to the first pixel of an image to be displayed.

In some embodiments, the near-eye display may further include a beam-folding prismatic element in an optical path between the first tiltable reflector and the beamsplitter, the beam-folding prismatic element comprising first and second adjacent surfaces and a first reflective polarizer at the first surface, wherein the beam-folding prismatic element is configured to reflect the first light beam emitted by the light source at least twice from within the beam-folding prismatic element, including one reflection from the first reflective polarizer, before redirecting the first light beam out of the beam-folding prismatic element through the second surface and towards the first tiltable reflector; and a QWP configured for receiving and propagating therethrough the first light beam exiting the beam-folding prismatic element. In operation, the first light beam propagated through the QWP after reflection from the tiltable reflector propagates through the beam-folding prismatic element.

Several embodiments of the beam scanner of this disclosure will now be described in detail. Referring to FIG. 1, a beam scanner 100 includes a tiltable reflector 102 for receiving a light beam 104 (only a chief ray shown for simplicity) from a light source 106 and reflecting the light beam 104 at a variable angle as the tiltable reflector 102 tilts up and down and, optionally, left to right. A beam-folded pupil relay 108 is configured to receive the light beam 104 from the tiltable reflector 102 and relay the light beam 104 to an exit pupil 110 of the beam-folded pupil relay 108.

In the embodiment shown, the beam-folded pupil relay 108 includes a beamsplitter 112 configured for receiving the light beam 104 reflected by the tiltable reflector 102, and reflecting at least a portion of the light beam 104 towards a curved reflector 114. The curved reflector 114 is configured to receive the portion of the light beam 104 reflected by the beamsplitter 112, and to reflect the portion of the light beam 104 back towards the beamsplitter 112. In the embodiment shown, the light beam 104 is reflected to propagate back substantially along an optical path of the impinging light beam. The retroreflection occurs regardless of the angle of tilt of the tiltable reflector 102.

For example, in FIG. 1, a first reflected beam 104A (at an upward-tilted tiltable reflector 102) is at least partially reflected by the beamsplitter 112 to propagate back through a first optical path 105A, and a second reflected beam 104B (at a downward-tilted tiltable reflector 102) is at least partially reflected by the beamsplitter 112 to propagate back through a second optical path 105B. To achieve retroreflection of a chief ray of the light beam 104, the curved reflector 114 may have a radius of curvature substantially equal to an optical path length from the first tiltable reflector 102 to the curved reflector 114. At this condition, the chief ray of the light beam 104 reflected from the center of the tiltable reflector 102 will always propagate along a radius of curvature of the curved reflector 114, and consequently will always be at (or close to) a normal (zero) angle of incidence at the curved reflector 114, and will get retroreflected. The optical path length from the curved reflector 114 to the exit pupil 110 may also be equal to the radius of curvature of the curved reflector 114. This will make sure that the light beam 104, regardless of the angle of propagation after reflection from the tiltable reflector 102, will always hit the center of the exit pupil 110, as shown. When the two optical paths are equal, the magnification along the optical path from the tiltable reflector 102 to the exit pupil 110 is equal to 1.

In some embodiments, the two paths are not equal. In other words, the path lengths between the curved reflector 114 and the tiltable reflector 102, on one hand, and path lengths between the curved reflector 114 and the exit pupil, on the other, may be different. Thus results in the magnification greater or less than unity. It is noted that the magnification of the exit pupil results in de-magnification of the scanning range, and vice versa.

To preserve optical power of the light beam, a scanner's light source may be constructed to emit polarized light, and the beamsplitter may be made polarization-selective. The polarization state of the light beam may be manipulated to ensure the desired folded optical path by using polarization-converting optical elements such as waveplates. Referring to FIG. 2, a near-eye display 200A includes a pupil-replicating waveguide assembly 240 optically coupled to a beam scanner 230A configured to receive a light beam 204 from a light source 206. The pupil-replicating waveguide assembly 240 may have one, two (as shown), three or more waveguides. The beam scanner 230A includes a tiltable reflector 202 optically coupled to a beam-folded pupil relay 208A. The tiltable reflector 202 may be a microelectromechanical (MEMS) tiltable reflector, and may be disposed in a hermetic package having a transparent window 203. A controller 250 may be operably coupled to the tiltable reflector 202 and the light source 206.

The beam-folded pupil relay 208A includes a polarization beamsplitter (PBS) 212 and a curved reflector 214, which in this embodiment includes a meniscus lens having a reflective coating on its distal (i.e. farthest form the PBS 212) convex surface. By way of non-limiting examples, the curved reflector 214 may also include a meniscus lens and a curved mirror, or simply a curved mirror, although a meniscus lens with a reflective coating may result in a more compact configuration. The PBS 212 is configured to reflect light having a first polarization state, polarized perpendicular to the plane of FIG. 2, and to transmit light having a second polarization state polarized in plane of FIG. 2 in this example. The second polarization state is orthogonal to the first polarization state.

The beam-folded pupil relay 208A may further include first 221 and second 222 quarter-wave waveplates (QWPs). The first QWP 221 is disposed in an optical path between the PBS 212 and a curved reflector 214. The first QWP 221 may be oriented such that a polarization state of a light beam changes to an orthogonal polarization state upon double passing the first QWP 221, i.e. from the first polarization state to the second polarization state. The second QWP 222 is disposed in an optical path between the tiltable reflector 202 and the PBS 212, and may also be oriented to convert between two orthogonal polarization states upon double pass. A first lens 231 may be disposed in an optical path between the tiltable reflector 212 and the PBS 212, for collimating the impinging diverging light beam 204, as well as for focusing the light beam 204 reflected by the tiltable reflector 202 to propagate towards the PBS 212. A second lens 232 may be disposed in an optical path between the PBS 212 and the exit pupil 210 of the beam-folding pupil relay 208A, for collimating the light beam 204 propagated through the PBS 212.

In operation, the light source 206 emits the light beam 204 having the second polarization state, i.e. in plane of FIG. 2. Divergence of the light beam 204 may be adjusted by an optional beam shaping optical element 207 such as a lens, for example. The shaping optical element 207 may have negative or positive optical (i.e. focusing or defocusing) power. The shaping optical element 207 may include a refractive, reflective, diffractive element, etc., or a combination of the above. Since the light beam 204 has the second polarization state, it propagates through the PBS 212 substantially without a reflection loss. Then, the light beam 204 propagates through the second QWP 222, becomes circularly polarized, propagates through the window 203, and impinges onto the tiltable reflector 202, which reflects the light beam 204 at a variable angle, e.g. upwards as shown. Then, the light beam 204 propagates again through the window 203.

The light beam 204 reflected from the tiltable reflector 202 and impinging onto the PBS 212 has the first polarization state, i.e. perpendicular to the plane of FIG. 2. This causes the light beam 204 to be reflected by the PBS 212 and to impinge onto the curved reflector 214 after propagating through the first QWP 221, which changes the polarization state of the light beam 204 to a circular polarization. Upon a second pass through the first QWP 221, the light beam 204 becomes linearly polarized in the second polarization state, and consequently propagates through the PBS 212 and is collimated by the second lens 232 before impinging onto the pupil-replicating waveguide assembly 240. The collimated light beam 204 exits at the exit pupil 210 regardless of the angle of tilt of the tiltable reflector 202.

As noted above, the tiltable reflector 202 may include a MEMS tiltable reflector. The MEMS reflector may be tiltable in two dimensions, e.g. both up and down and left-right in FIG. 2, i.e. in-plane and out-of-plane of FIG. 2. The first 231 and second 232 lenses, as well as the meniscus reflective lens of the curved reflector 214, may be optimized to reduce optical aberrations across the entire range of scanning of the tiltable reflector 202. The second QWP 222 may be disposed on the other side of the first lens 231, i.e. it may be laminated onto the window 203, or it may replace the window 203.

The controller 250 of the near-eye display 200A may be configured to operate the tiltable reflector 202 to cause the light beam 204 at the exit pupil 210 of the beam-folded pupil relay 208A to have a beam angle corresponding to a particular pixel of an image in angular domain to be displayed by the near-eye display 200A. The controller 250 operates the light source 206 in coordination with operating the tiltable reflector 202, such that the light beam 204 has brightness, color, etc. corresponding to the pixel being displayed. The entire image in angular domain is formed when the light beam 204 is scanned in two dimensions, e.g. over X- and Y-viewing angles, over the entire frame or field of view (FOV) of the near-eye display 200A. When the frame rate is high enough, the eye of the user integrates the scanned light beam 204, enabling the user to see the displayed imagery substantially without flicker.

Figure 2A:
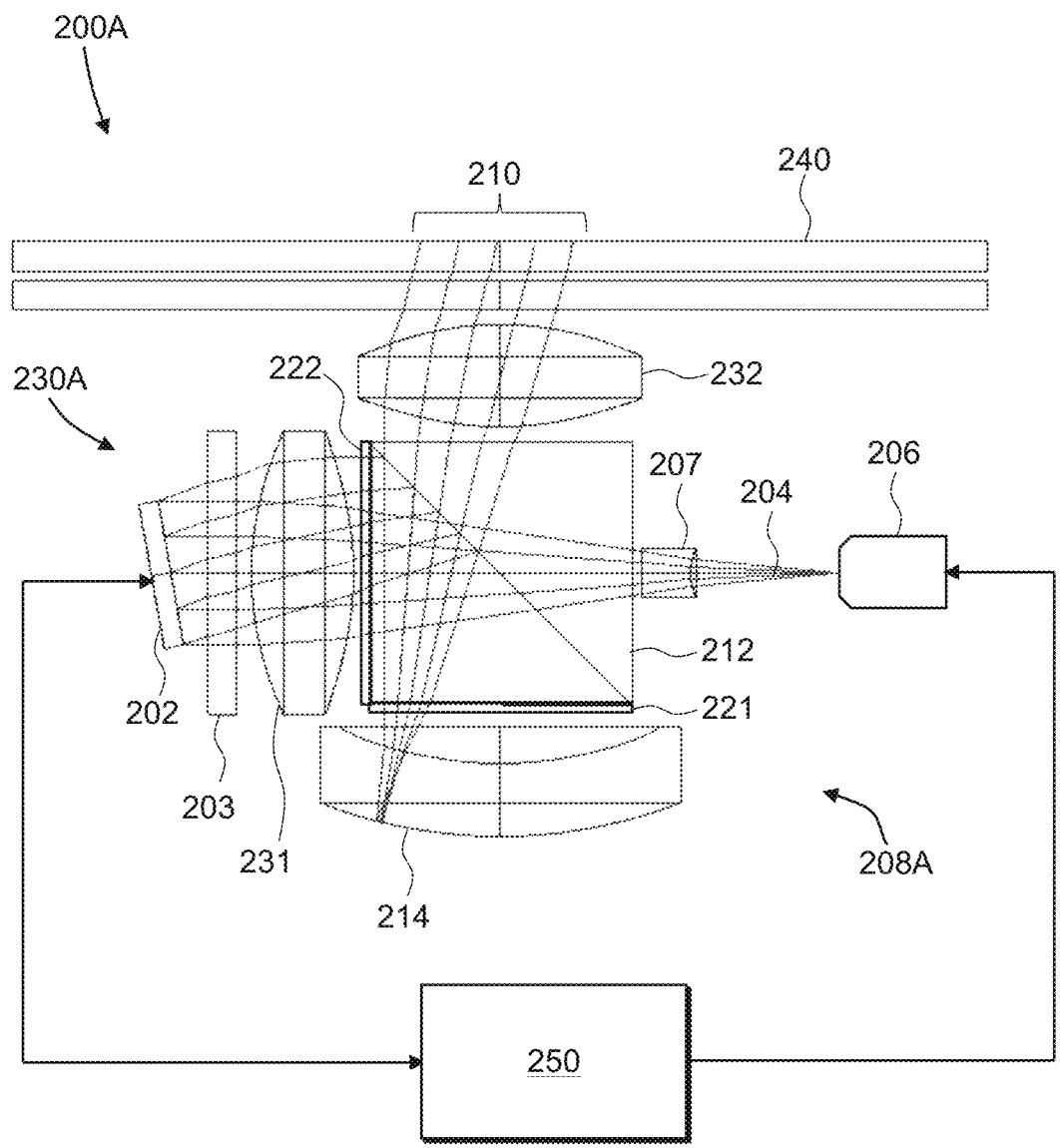
FIG. 2A is a schematic ray-traced view of a near-eye display including a beam scanner of FIG. 1.
Figure 2B:
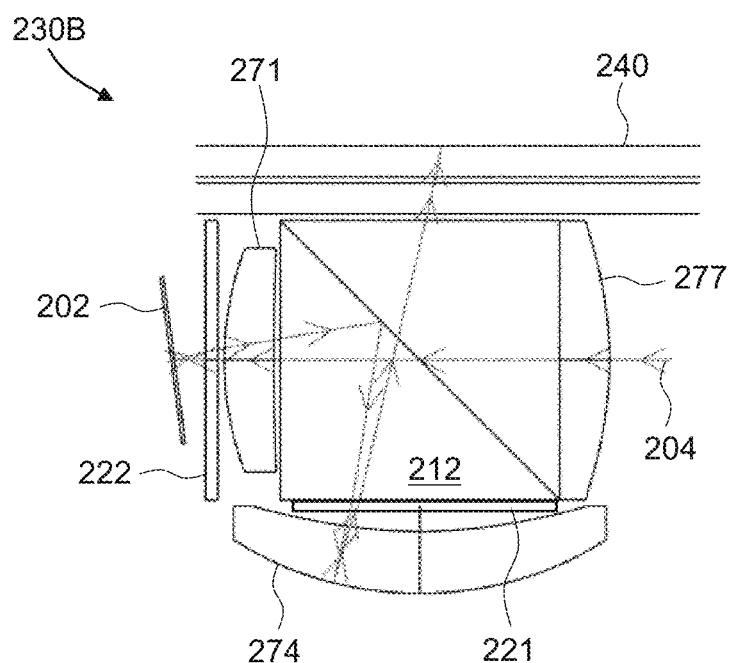
FIG. 2B is a schematic cross-sectional view of a beam scanner embodiment of this disclosure.
Figure 2C:
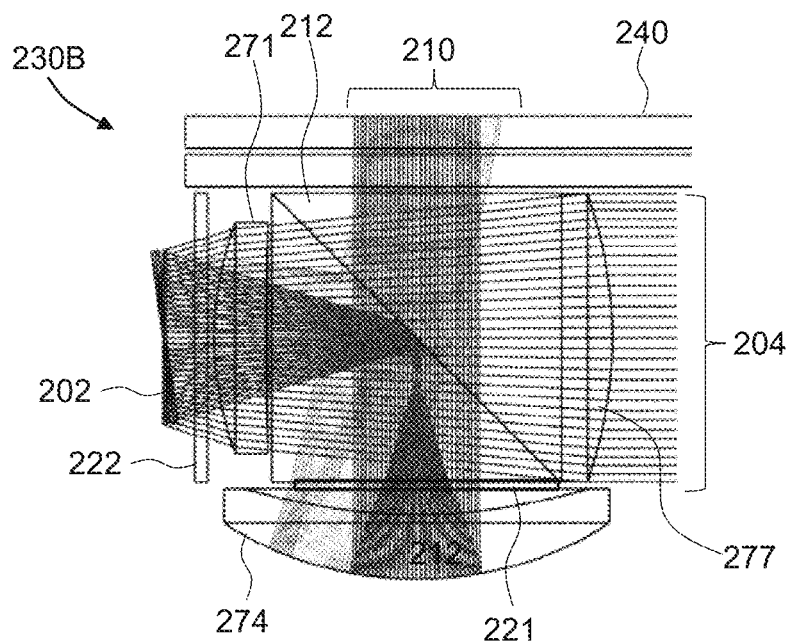
FIG. 2C is a ray-traced view of the beam scanner embodiment of FIG. 2B.

Referring to FIGS. 2B and 2C, a beam scanner variant 230B includes the tiltable reflector 202, the PBS 212, the first 221 and second 222 QWPs, a curved reflector 274, an in-coupling lens 277, and a focusing lens 271. The in-coupling lens 277 and the focusing lens 271 are disposed on opposite sides of the PBS 212. The curved reflector 274 is disposed on opposite side of the PBS 212 w.r.t. the waveguide assembly 240. In this configuration, the light beam 204 incident on the tiltable reflector 202 is not collimated, and thus ghost images induced by reflections between the second QWP 222 and/or a cover glass of the tiltable reflector and the tiltable reflector 202 are not in-focus.

In operation, the in-coupling lens 277 slightly focuses the light beam 204 linearly polarized in plane of FIG. 2C. The light beam 204 propagates through the PBS 212 and is focused by the focusing lens 271. The tiltable reflector 202 receives the light beam 204 and reflects the light beam 204 at a variable angle. Upon propagation twice through the second QWP 222, the light beam 204 becomes polarized perpendicular to the plane of FIG. 2C and thus is reflected by the PBS 212 to impinge onto the curved reflector 274, which collimates the light beam 204 and directs the light beam 204 back towards the PBS 212. Upon propagating twice through the first QWP 221, the light beam 204 becomes polarized in plane of FIG. 2C, and accordingly propagates through the PBS 212 to the exit pupil 210. It is further noted that, although the PBS 212 may have a cubical shape, the shape of the PBS 212 may be determined by the shape of the FOV being generated by the beam scanner 230B (and the beam scanner 230A of FIG. 2A, for that matter). In other words, if the FOV is square, the shape of the PBS 212 may be cubical. If, however, the FOV is rectangular, e.g. 60 by 40 degrees, the shape of the PBS 212 may be a cuboid with two square side faces (the faces parallel to the plane of FIGS. 2A, 2B, and 2C) and non-square (6:4 in this example) rectangular top and bottom faces, resulting in a more compact configuration.

In embodiments where the light beam includes color channel components, e.g. red (R), green (G), and blue (B) color channel components, the curved reflectors 214, 274 may be optimized to lessen the effects of chromatic aberration. Referring to FIG. 2D, the light beam 204 includes a R channel component 204R, a G channel component 204G, and a B channel component 204B. The first curved reflector 214 includes a distal convex reflector surface 284 (top portion of FIG. 2D) and a proximal concave refractive surface 285. Herein, the terms "distal" and "proximal" are with reference to the PBS 212. As illustrated at the bottom portion of FIG. 2D, the convex reflector surface 284 may include a plurality of dichroic coatings each reflecting its own color channel component and optionally transmitting other channel components. For example, a B channel dichroic coating 284B may reflect B channel component while transmitting R and G channel components; a G channel dichroic coating 284G may reflect G channel component while transmitting R channel component; and an R channel coating 284R may reflect the R channel component. The R channel coating 284R may, but does not have to be, dichroic, as it reflects all remaining light. The R, G, and B channel coatings 284R, 284G, and 284B may be disposed at different distances from the proximal concave refractive surface 285 of the first curved reflector 214 to offset or lessen chromatic aberration that may be present in the near-eye display 200. The order of the R, G, and B channel coatings 284R, 284G, and 284B may differ from the one illustrated.

Figure 3:
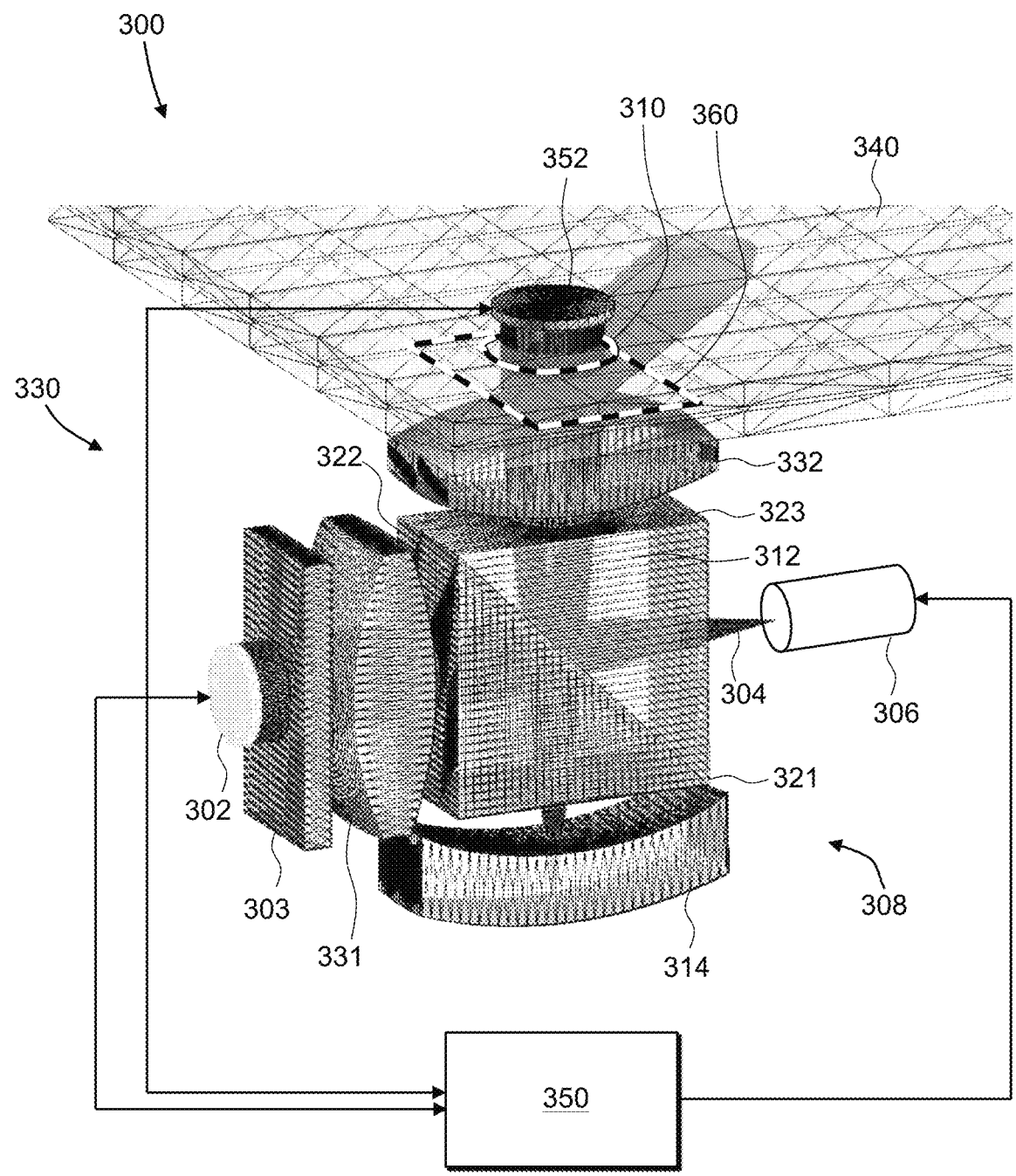
FIG. 3 is a schematic view of a near-eye display including a beam-folded pupil relay and two 1D tiltable reflectors.

Referring now to FIG. 3, a near-eye display 300 includes a pupil-replicating waveguide assembly 340 including one or more pupil-replicating waveguides. The pupil-replicating waveguide assembly 340 is optically coupled to a beam scanner 330 configured to receive a light beam 304 from a light source 306. The beam scanner 330 includes first 302 and second 352 1D tiltable reflectors, e.g. 1D tiltable MEMS reflectors, optically coupled to a beam-folded pupil relay 308. The first 1D tiltable reflector 302 is configured for scanning the light beam 304 along a first direction, and the second 1D tiltable reflector 352 is configured for scanning the light beam 304 along a second direction non-parallel to the first direction, e.g. perpendicular to the first direction. A controller 350 is operably coupled to the first 302 and second 352 1D tiltable reflectors and the light source 306.

The beam-folded pupil relay 308 is similar to the beam-folded pupil relay 208A of FIG. 2A, and includes similar elements. Briefly, the beam-folded pupil relay 308 (FIG. 3) includes first 321 and second 322 QWPs. The first QWP 321 is disposed in an optical path between a PBS 312 and a curved reflector 314. The second QWP 322 is disposed in an optical path between the tiltable reflector 302, a window 303, and the PBS 312. A third QWP 323 is provided. The third QWP 323 is disposed in an optical path between the PBS 312 and the pupil-replicating waveguide assembly 340. The first 321 and second 322 QWPs are oriented to convert between two orthogonal polarization states upon double pass. The third QWP 323 is oriented to convert a linear polarization into a circular polarization. There is no double pass through the third QWP 323. A first lens 331 is disposed in an optical path between the first tiltable reflector 302 and the PBS 312, and a second lens 332 is disposed in an optical path between the PBS 312 and an exit pupil 310 of the beam-folding pupil relay 308.

In operation, the light source 306 emits the light beam 304 having the second polarization state, and consequently it propagates through the PBS 312 substantially without a reflection loss, i.e. with a low or negligible reflection loss. The light beam 304 impinges onto the first tiltable reflector 302, which reflects the light beam 304 at a variable angle in the vertical plane, i.e. upwards and downwards in FIG. 3. Then, the light beam 304 is reflected by the PBS 312 to impinge onto the curved reflector 314 after propagating through the first QWP 321. In this embodiment, the curved reflector 314 includes a meniscus lens with a reflective coating on the distal side. The light beam 304 having the second polarization state propagates through the PBS 312 and is collimated by the second lens 332 after propagating through the third QWP 323, which makes the light beam 304 circularly polarized. The circularly polarized light beam 304 propagates through the pupil-replicating waveguide assembly 340. The pupil-replicating waveguide assembly 340 may include polarization-selective input grating 360. For example, each waveguide of the pupil-replicating waveguide assembly 340 may include a polarization-selective input grating 360. The polarization-selective input grating 360 is configured to diffract light of one handedness of circular polarization and to transmit light at the other handedness of the circular polarization substantially without diffraction. In this embodiment, the light beam 304 has such a polarization that the input grating 360 does not diffract the light beam 304 impinging onto the pupil-replicating waveguide assembly 340 at the first pass, i.e. upwards in FIG. 3. An exemplary embodiment of the polarization-selective input grating 360 will be considered further below.

The second tiltable reflector 352 is disposed proximate an exit pupil 310 of the beam-folded pupil relay 308 and above the pupil-replicating waveguide assembly 340. As noted, the second tiltable reflector 352 scans the light beam 304 along the second direction, e.g. left-to-right and right-to-left in FIG. 3. The light beam 304 is reflected by the second tiltable reflector 352 back towards the pupil-replicating waveguide assembly 340. Upon reflection, the handedness of the circular polarization of the light beam 304 changes, and consequently the light beam 304 is diffracted by the polarization-selective input grating 360 to propagate in the pupil-replicating waveguide assembly 340, as shown. It is to be understood that the beam-folded pupil relay 308 places the light beam 304 approximately at the center of the second tiltable reflector 352, regardless of the angle of tilt of the first tiltable reflector 302. This enables one to reduce the geometrical size of the second tiltable reflector 352. Furthermore, since the first tiltable reflector 302 redirects or scans the light beam 304 in one plane only, the size of the entire beam-folded pupil relay 308 in a direction perpendicular to the direction of scanning, i.e. a profile of the beam-folded pupil relay 308, may be reduced. This is seen in FIG. 3, where e.g. the PBS 312 is not a cube but rather is a low-profile parallelogram, and the first 331 and second 332 lenses are truncated.

The controller 350 of the near-eye display 300 may be configured to operate the first 302 and second 352 tiltable reflectors to cause the light beam 304 at the input grating 360 of the pupil-replicating waveguide assembly 340 to have a beam angle corresponding to a particular pixel of an image in angular domain to be displayed by the near-eye display 300. The controller 350 operates the light source 306 in coordination with operating the tiltable reflectors 302 and 352, such that the light beam 304 has brightness corresponding to the pixels being displayed. The entire image in angular domain is formed when the light beam 304 is scanned in two dimensions, e.g. over X- and Y-viewing angles, over the entire frame or FOV of the near-eye display 300.

As mentioned before, when the light beam 304 first passes through the pupil replicating waveguide assembly 340, the polarization state of the light beam 304 is such that the polarization-selective input gratings 360 do not in-couple the light. At this stage, the light beam 304 has been scanned in one dimension, so in angle space it sweeps out a bright line. The second tiltable reflector 352 sweeps this bright line to fill the full field of view frustum (approximately rectangular). Returning to the first pass through the pupil-replicating waveguide assembly 340: when the bright scanning beam (sweeping out a line) passes through the polarization-selective input gratings 360 on the first pass, there is a chance that a small fraction of light will in-couple into the waveguide(s), which would appear as a line in angle space after outcoupling to the eye. One mitigation of the artifact is to tilt the entire optical assembly relative to the pupil-replicating waveguide assembly 340 such that the first pass bright line passes through the polarization-selective input gratings 360 at an angle outside the supported field of view. The second tiltable reflector 352 then needs to be biased to return the scanned field of view to the center relative to the waveguide axis. This increases the obliquity of illumination on the second tiltable reflector 352, but mitigates the bright line artifact.

Figure 4A:
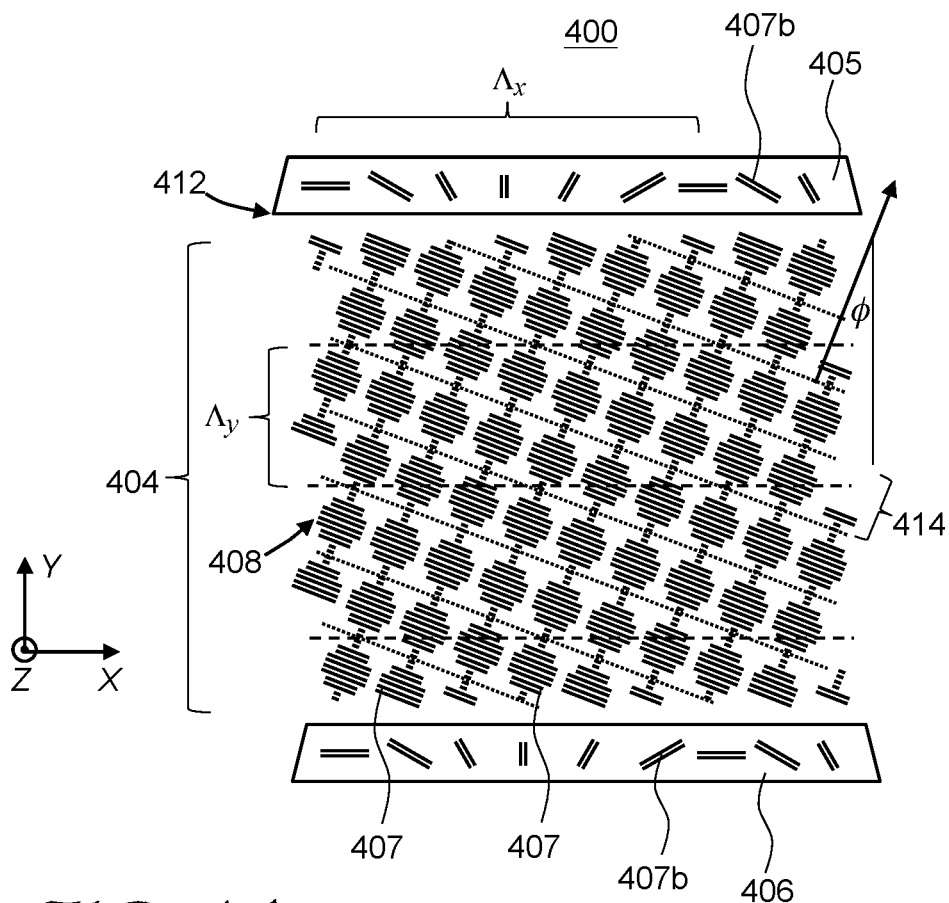
FIG. 4A is a schematic cross-sectional view of a polarization volume hologram (PVH) grating usable in the near-eye display of FIG. 3.

An exemplary embodiment of the polarization-selective grating 360 will now be considered. Referring to FIG. 4A, a polarization volume hologram (PVH) grating 400 includes an LC layer 404 bound by opposed top 405 and bottom 406 parallel surfaces. The LC layer 404 may include an LC fluid containing rod-like LC molecules 407 with positive dielectric anisotropy, e.g. nematic LC molecules. A chiral dopant may be added to the LC fluid, causing the LC molecules in the LC fluid to self-organize into a periodic helical configuration including helical structures 408 extending between the top 405 and bottom 406 parallel surfaces of the LC layer 404. Such a configuration of the LC molecules 407, termed herein a cholesteric configuration, includes a plurality of helical periods p, e.g. at least two, at least five, at least ten, at least twenty, or at least fifty helical periods p between the top 405 and bottom 406 parallel surfaces of the LC layer 404. Boundary LC molecules 407b at the top surface 405 of the LC layer 404 may be oriented at an angle to the top surface 405. The boundary LC molecules 407b may have a spatially varying azimuthal angle, e.g. linearly varying along X-axis parallel to the top surface 405, as shown in FIG. 4A. To that end, an alignment layer 412 may be provided at the top surface 405 of the LC layer 404. The alignment layer 412 may be configured to provide the desired orientation pattern of the boundary LC molecules 407b, such as the linear dependence of the azimuthal angle on the X-coordinate. A pattern of spatially varying polarization directions of the UV light may be selected to match a desired orientation pattern of the boundary LC molecules 407b at the top surface 405 and/or the bottom surface 406 of the LC layer 404. When the alignment layer 412 is coated with the cholesteric LC fluid, the boundary LC molecules 407b are oriented along the photopolymerized chains of the alignment layer 412, thus adopting the desired surface orientation pattern. Adjacent LC molecules adopt helical patterns extending from the top 405 to the bottom 406 surfaces of the LC layer 404, as shown.

The boundary LC molecules 407b define relative phases of the helical structures 408 having the helical period p. The helical structures 408 form a volume grating comprising helical fringes 414 tilted at an angle $\phi$, as shown in FIG. 4A. The steepness of the tilt angle $\phi$ depends on the rate of variation of the azimuthal angle of the boundary LC molecules 407b at the top surface 405 and p. Thus, the tilt angle $\phi$ is determined by the surface alignment pattern of the boundary LC molecules 407b at the alignment layer 412. The volume grating has a period along $\Lambda_x$ along X-axis and $\Lambda_y$ along Y-axis. In some embodiments, the periodic helical structures 408 of the LC molecules 407 may be polymer-stabilized by mixing in a stabilizing polymer into the LC fluid, and curing (polymerizing) the stabilizing polymer.

Figure 4B:
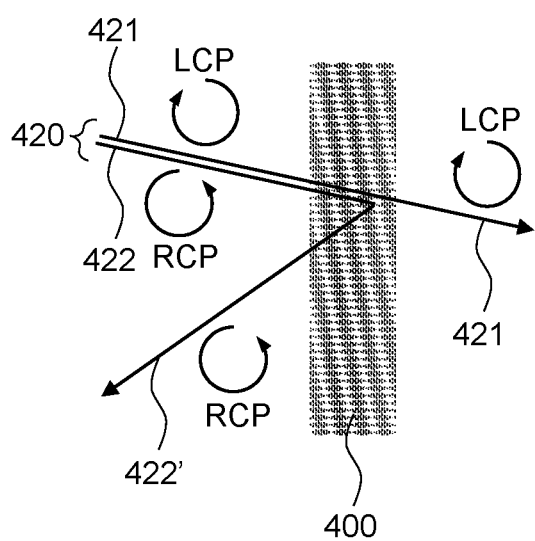
FIG. 4B is a schematic diagram illustrating the principle of operation of the PVH grating of FIG. 4A.

The helical nature of the fringes 414 of the volume grating makes the PVH grating 400 preferably responsive to light of polarization having one particular handedness, e.g. left- or right-circular polarization, while being substantially non-responsive to light of the opposite handedness of polarization. Thus, the helical fringes 414 make the PVH grating 400 polarization-selective. This is illustrated in FIG. 4B, which shows a light beam 420 impinging onto the PVH grating 400. The light beam 420 includes a left circular polarized (LCP) beam component 421 and a right circular polarized (RCP) beam component 422. The LCP beam component 421 propagates through the PVH grating 400 substantially without diffraction. Herein, the term "substantially without diffraction" means that, even though an insignificant portion of the beam (the LCP beam component 421 in this case) might diffract, the portion of the diffracted light energy is so small that it does not impact the intended performance of the PVH grating 400. The RCP beam component 422 of the light beam 420 undergoes diffraction, producing a diffracted beam 422'. The polarization selectivity of the PVH grating 400 results from the effective refractive index of the grating being dependent on the relationship between the handedness, or chirality, of the impinging light beam and the handedness, or chirality, of the grating fringes 414. It is further noted that the sensitivity of the PVH 400 to right circular polarized light in particular is only meant as an illustrative example. When handedness of the helical fringes 414 is reversed, the PVH 400 may be made sensitive to left circular polarized light.

In the near-eye displays 200A of FIG. 2A and 300 of FIG. 3, the light beam propagates through a PBS before impinging onto a tiltable mirror. For example, in FIG. 2, the light beam 204 emitted by the light source 206 propagates through the PBS 212 before impinging onto the tiltable reflector 202. Even though the light beam 204 is polarized to be transmitted entirely through the PBS 212, a small portion may be reflected by the PBS 212 upwards, creating a diverging ghost beam that may reduce the contrast of the displayed image. To avoid reduction of contrast due to the ghost beam, the tiltable reflector may be illuminated by a light beam in a configuration that does not involve propagating the light beam through the PBS of the beam-folded pupil relay before impinging onto the tiltable reflector for the first time.

Figure 5:
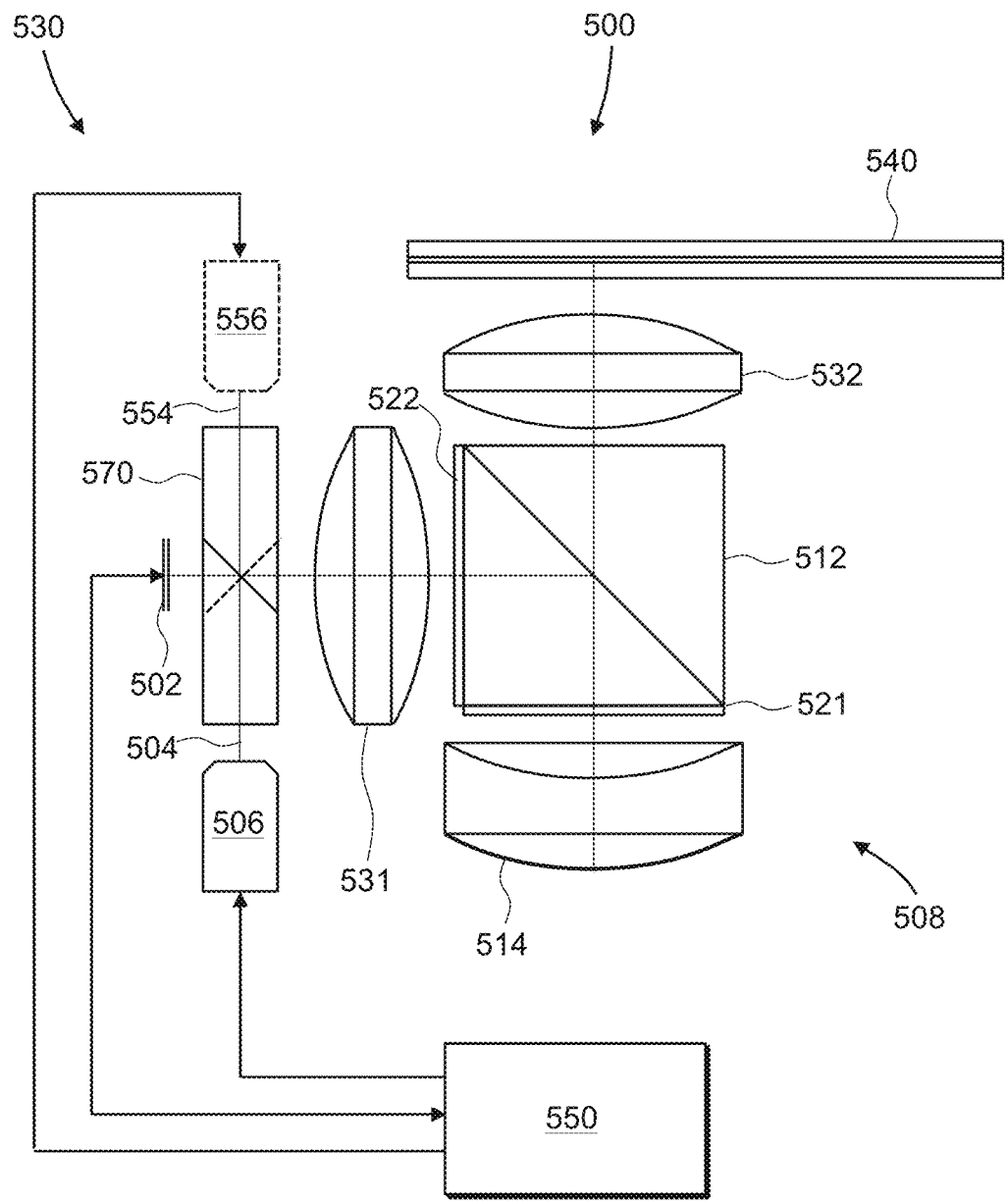
FIG. 5 is a schematic view of a near-eye display including a beam-folding element.

Referring to FIG. 5, a near-eye display 500 is similar to the near-eye display 200A of FIG. 2A. Briefly, the near-eye display 500 includes a pupil-replicating waveguide assembly 540 optically coupled to a beam scanner 530. The pupil-replicating waveguide assembly 540 may include one or more individual pupil-replicating waveguides. The beam scanner 530 is configured to receive a first light beam 504 from a first light source 506 and, optionally, a second light beam 554 from a second light source 556 via a beam-folding prismatic element 570. Embodiments of the beam-folding prismatic element 570 will be considered further below. The beam scanner 530 includes a tiltable reflector 502 optically coupled to a beam-folded pupil relay 508. A controller 550 is operably coupled to the tiltable reflector 502 and the first 506 and second 556 light sources.

The beam-folded pupil relay 508 includes a PBS 512 and a curved reflector 514 including a meniscus lens having a reflective coating on its distal convex surface. The PBS 512 is configured to reflect light having a first polarization state, polarized perpendicular to the plane of FIG. 5, and to transmit light having a second polarization state polarized in plane of FIG. 5 in this example.

The beam-folded pupil relay 508 further includes first 521 and second 522 QWPs. The first QWP 521 is disposed in an optical path between the PBS 212 and the curved reflector 514. The second QWP 522 is disposed in an optical path between the tiltable reflector 502 and the PBS 512. Both QWPs 521 and 522 are oriented to convert between two orthogonal polarization states upon double pass. A first lens 531 is disposed in an optical path between the tiltable reflector 502 and the PBS 512, and a second lens 532 is disposed in an optical path between the PBS 512 and the pupil-replicating waveguide assembly 540.

In operation, the light sources 506 and 556 emit the first 504 and second 554 light beams. The beam-folding prismatic element 570 conveys the light beams 504, 554 to the tiltable reflector 502, and transmits through the light beams 504, 554 reflected by the tiltable reflector 502 at variable angles. The light beams 504, 554 then propagate through the beam-folded pupil relay 508 similarly to what has been explained above with reference to the beam-folded pupil relay 208A of the near-eye display 200A of FIG. 2A.

Figure 6:
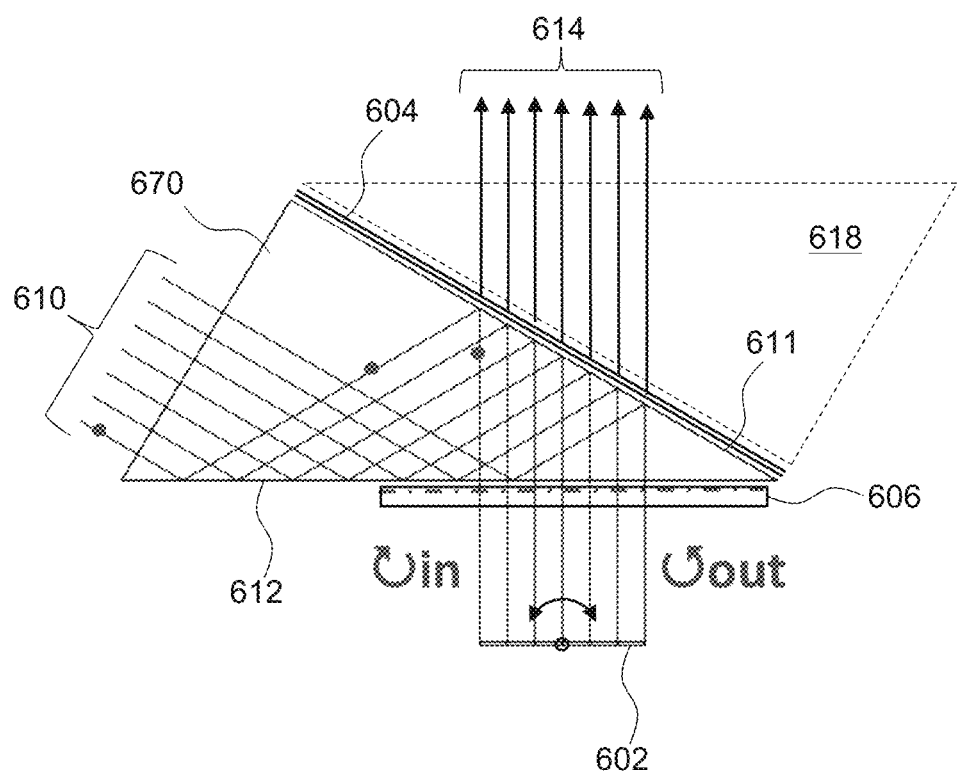
FIG. 6 is a side cross-sectional view of a beam-folding prismatic element usable as the beam-folding element in the near-eye display of FIG. 5.
Figure 7:
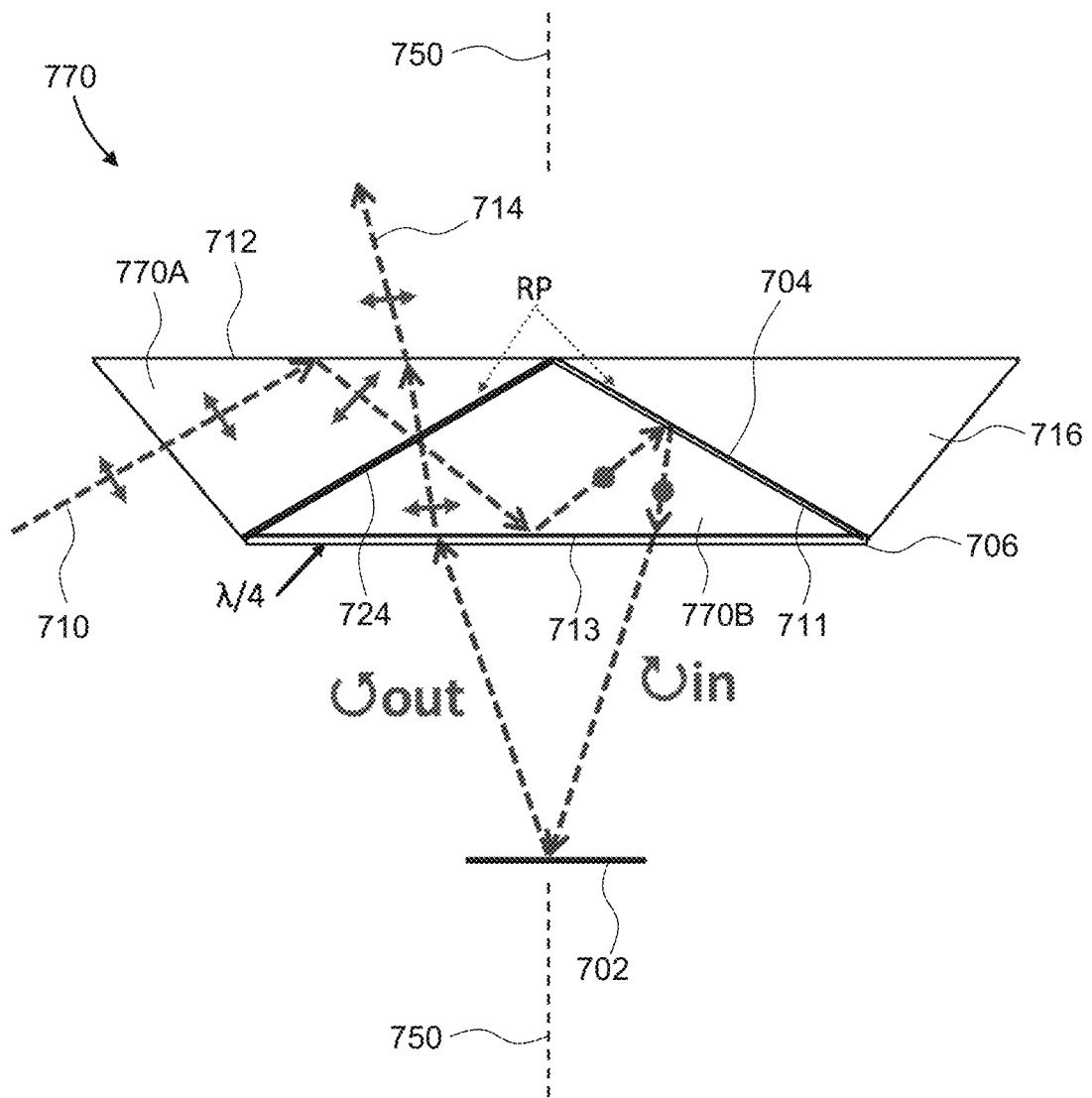
FIG. 7 is a side cross-sectional view of a dual-input beam-folding prismatic element usable as the beam-folding element in the near-eye display of FIG. 5.

Embodiments of the beam-folded pupil relay 508 will now be considered with reference to FIGS. 6 and 7. Referring first to FIG. 6, a beam-folding prismatic element 670 has first 611 and second 612 adjacent surfaces, and a reflective polarizer (RP) 604 disposed at the first surface 611. A QWP 606 is disposed at the second surface 612 of the beam-folding prismatic element 670. A tiltable reflector 602 is disposed next to the QWP 606.

In operation, a light beam 610 impinges onto the beam-folding prismatic element 670. The impinging light beam 610 is linearly polarized perpendicular to the plane of FIG. 6 in this example, although it may be polarized differently depending on optical configuration. The light beam 610 propagating in the beam-folding prismatic element 670 is reflected by the second surface 612 towards the first surface 611. The reflective polarizer 604 is configured to reflect light linearly polarized perpendicular to the plane of FIG. 6, and to transmit light polarized in the plane of FIG. 6. Thus, the reflective polarizer 604 reflects the light beam 610 to propagate back to the first surface 611, albeit at a different angle of incidence than the angle of first incidence of the light beam 610 onto the second surface 612. Thus, the beam-folding prismatic element 670 is configured to reflect the impinging light beam 610 at least twice from within the beam-folding prismatic element 670, including one reflection from the reflective polarizer 604, before redirecting the light beam 610 out of the beam-folding prismatic element 670 through its second surface 612.

The QWP 606 receives and propagates through the light beam 610 exiting the beam-folding prismatic element 670. Upon propagating through the QWP 606, the light beam 610 becomes circularly polarized, e.g. right-circular polarized in this example. The tiltable reflector 602 receives the light beam 610 and reflect the light beam 610 back towards the QWP 606. The angle at which the tiltable reflector 602 reflects the light beam 610 may be varied (scanned) by tilting the tiltable reflector 602.

The reflected light beam 610 becomes left-circular polarized. This is because the direction of propagation of the reflected light beam 610 changes, while the phase relationship between x- and y-component of the light field of the light beam 610 impinging onto the tiltable reflector 602 remains substantially the same. Since the handedness of the circular polarization is determined with the account of direction of propagation, the handedness of the reflected light beam 610 changes as well. The light beam 610 propagates again through the QWP after reflection from the tiltable reflector 602 and becomes polarized in plane of FIG. 6. This causes the light beam 610 propagating through the beam-folding prismatic element 670 (upwards in FIG. 6) to further propagate through the reflective polarizer 604 forming an output light beam 614. More generally, the impinging light beam 610 may have a first polarization state, and the reflective polarizer 604 is configured to reflect light having the first polarization state and to transmit light having a second polarization state, whereby the light beam 610 propagated twice through the QWP 606 exits the beam-folding prismatic element 670 through the reflective polarizer 604. The angle of the output light beam 614 depends on the angle of tilt of the tiltable reflector 602. It is to be understood that the tiltable reflector 602 may be tiltable in two axes, i.e. both in plane of FIG. 6 and perpendicular to that plane.

The beam-folding prismatic element 670 may be made of an optically clear material such as glass, plastic, etc. The first 611 and second 612 surfaces may form an angle of less than 45 degrees, e.g. 30 degrees or less, for a more compact configuration. In some embodiments, the beam-folding prismatic element 670 is configured to reflect the light beam 610 at the second surface 612 by total internal reflection (TIR). To that end, the beam-folding prismatic element 670 may have a high enough refractive index such that the angle of incidence of the light beam 610 onto the second surface 612 from within the beam-folding prismatic element 670 is larger than a TIR critical angle determined by the refractive index. To facilitate the TIR of the light beam 610 from the second surface 612, the QWP 606 may be separated from the second surface 612 of the beam-folding prismatic element 670 by a thin air gap. The QWP 606 may extend substantially parallel to the second surface 612 of the beam-folding prismatic element 670. In some embodiments, the QWP 606 is laminated onto the second surface 612.

The QWP 606 may be made of a material with suitable birefringence, e.g. a birefringent polymer sheet or a rigid crystalline material, such as crystalline quartz, for example. The QWP 606 may be a zero-order QWP and/or may include a stack of thin crystalline materials or a stack of birefringent polymer sheets with optical axes at non-zero angles to each other. In some embodiments of the beam-folding prismatic element 670, a second prismatic element 618 (shown in dashed lines) may be provided for propagating therethrough the light beam 610 outputted by the beam-folding prismatic element 670, the second prismatic element 618 adjoining the first reflective polarizer 604.

Turning to FIG. 7, a beam-folding prismatic element 770 has first 711 and second 712 adjacent surfaces, and a first reflective polarizer (RP) 704 disposed at the first surface 711. In the embodiment shown, the beam-folding prismatic element 770 includes first 770A and second 770B portions and a second reflective polarizer 724 sandwiched between the first 770A and second 770B portions of the beam-folding prismatic element 770. Thus, the second reflective polarizer 724 is disposed within the beam-folding prismatic element 770 in an optical path of a first light beam 710, the optical path extending between reflections from the second 712 and third 713 surfaces within the beam-folding prismatic element 770. The first light beam 710 may be provided by a first light source, not shown in FIG. 7.

The third surface 713 of the beam-folding prismatic element 770 is adjacent its second surface 712. A QWP 706 is optically coupled to the third side 713 of the beam-folding prismatic element 770. In some embodiments, the QWP 706 is laminated onto the third side 713. A tiltable reflector 702 is disposed next to the QWP 706. The tiltable reflector 702 may be tilted about one or two non-parallel axes of tilt. In FIG. 7, the tiltable reflector 702 is shown in its nominal, i.e. untilted, position.

In operation, the first light beam 710, which is linearly polarized in plane of FIG. 7 in this example, undergoes a first reflection from the second surface 712, propagates through the second reflective polarizer 724 configured to transmit light at that polarization, and undergoes a second reflection from the third surface 713 through the QWP 706. The QWP 706 changes its polarization to a linear polarization perpendicular to the plane of FIG. 7, because the first light beam 710 propagates through the QWP 706 twice.

The first reflective polarizer 704 is configured to reflect light at linear polarization perpendicular to the plane of FIG. 7. Thus, the first light beam 710 is reflected by the first reflective polarizer 704 and exits the second portion 770B of the beam-folding prismatic element 770 at the third surface 713 through the QWP 706. Upon exiting the third surface 713, the first light 710 is circularly polarized (e.g. right-handed circular polarization). Then, the first light beam 710 is reflected by the tiltable reflector 702 at a variable angle depending on the current tilt angle of the tiltable reflector 702. The reflected light beam 710 remains circularly polarized, but the handedness is flipped (e.g. becomes left-handed circularly polarized). The reflected light beam 710 propagates back through the QWP 706, which changes the polarization of the first light beam 710 back to linear polarization in the plane of FIG. 7. The second linear polarizer 724 is configured to transmit light at that polarization, and the first light beam 710 propagates thorough the second reflective polarizer 724 (or through the first reflective polarizer 704, depending on the angle of tiltable reflector 702), and out of the first portion 770A (or 716, depending on tilt angle of the tiltable reflector 702) of the beam-folding prismatic element 770 forming an output light beam 714. The beam angle of the output light beam 714 depends on the tilt angle (in x and y planes) of the tiltable reflector 702.

In some embodiments, the beam-folding prismatic element 770 may further include a second prismatic element 716 coupled to the first surface 711 of the beam-folding prismatic element 770 through the first reflective polarizer 704, which may be sandwiched between the second portion 770B of the beam-folding prismatic element 770 and the second prismatic element 716. The second prismatic element 716 may have the same shape as the first portion 770A of the beam-folding prismatic element 770, making the structure of the beam-folding prismatic element 770 symmetrical about a vertical plane 750 running through the middle of the beam-folding prismatic element 770 and perpendicular to the plane of FIG. 7. A second light beam, not shown, may be injected through the second prismatic element 716. Due to the symmetry, the optical path of the second light beam will be a mirror image of the optical path of the first light beam 710.

Figure 8A:
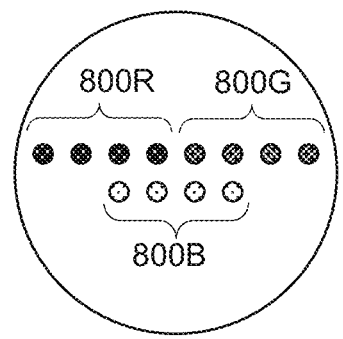
FIGS. 8A, 8B, and 8C are frontal views of multi-emitter light sources usable in near-eye displays disclosed herein.
Figure 8B:
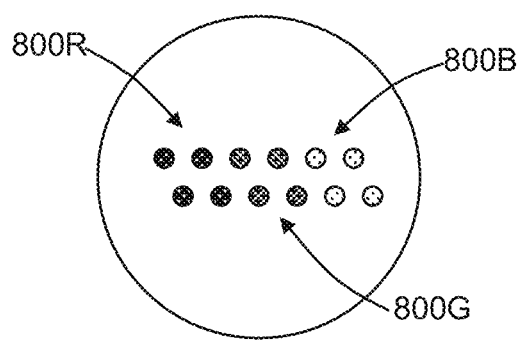
Figure 8C:
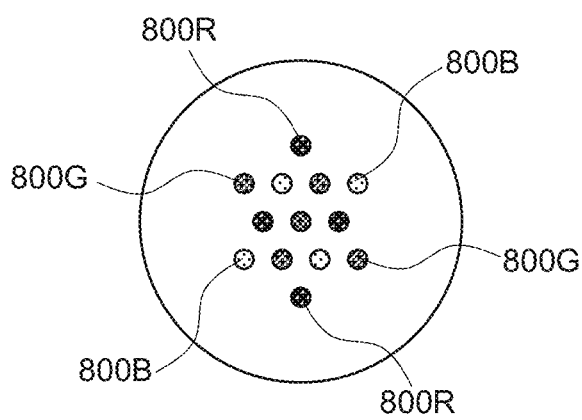

The light sources 106 of FIG. 1, 206 of FIG. 2, 306 of FIG. 3, and 506 and 556 of FIG. 5 may each include a plurality of individually controllable emitters, e.g. superluminescent light-emitting diodes (SLEDs). Several emitters may be provided for each color channel. Referring to FIGS. 8A, 8B, and 8C, four red emitters 800R may be provided for red (R) color channel (dark-shaded circles); four green emitters 800G may be provided for green (G) color channel (medium-shaded circles); and four blue emitters 800B may be provided for blue (B) color channel (light-shaded circles). The emitters 800R, 800G, and 800B may each be ridge emitters sharing a common semiconductor substrate. The emitters 800R, 800G, and 800B may be disposed in a line pattern (FIG. 8A); in a zigzag pattern (FIG. 8B); or in a honeycomb pattern (FIG. 8C), to name just a few examples.

Having a plurality of emitters illuminating a same tiltable reflector enables the scanning of the light beams generated by the emitters to be performed together as a group. When a light source includes a plurality of individual emitters, the illuminating light beam includes a plurality of sub-beams co-propagating at a slight angle w.r.t each other. Maximum angular cone of the sub-beams may be less than 5 degrees, or less than 2 degrees, or less than 1 degree in some embodiments. Multiple emitters and, in some cases, multiple light sources may be used to provide redundancy in case some of light sources fail, increase image resolution, increase overall image brightness, etc. Multiple light sources may each be equipped with its own collimator.

Figure 9A:
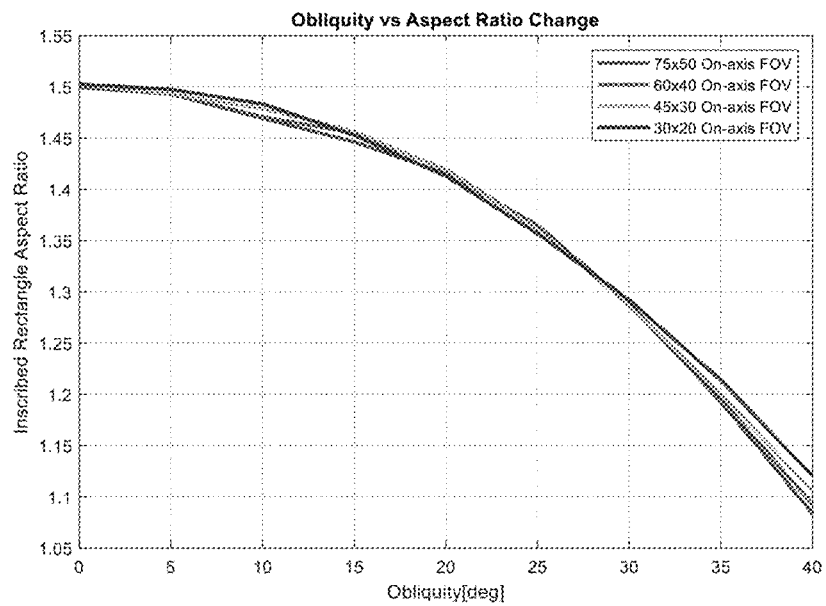
FIG. 9A is a graph of aspect ratio of a field of view (FOV) of a scanning projector display as a function of beam obliquity.
Figure 9B:
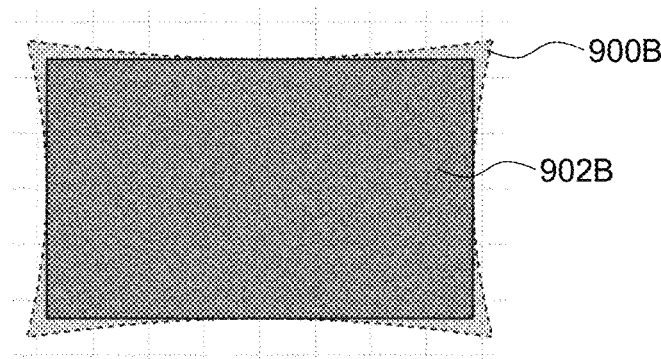
FIG. 9B is a schematic view of a FOV at zero obliquity in FIG. 9A.
Figure 9C:
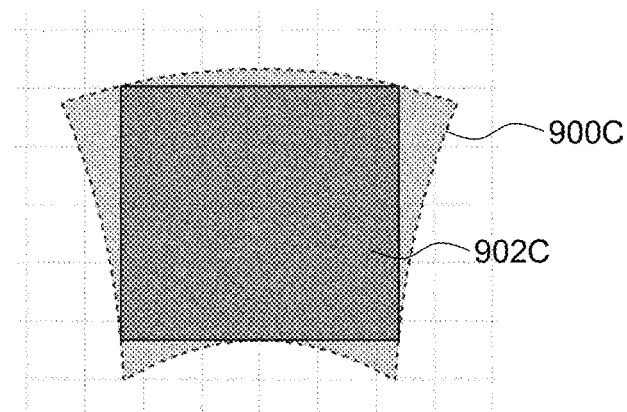
FIG. 9C is a schematic view of a FOV at maximum obliquity in FIG. 9A.

The near-eye displays 200A of FIG. 2A, 300 of FIG. 3, and 500 of FIG. 5 provide a low-obliquity coupling of light beam(s) to a tiltable reflector. Herein, the term "low obliquity" means a low angle of incidence, i.e. a normal incidence, at the tiltable reflector when in a nominal, e.g. a center or zero, angle of tilt. One advantage of having low obliquity is illustrated in FIGS. 9A to 9C. Referring first to FIG. 9A, an aspect ratio of a FOV of a projector using a tiltable reflector is plotted as a function of obliquity, i.e. angle of incidence at the tiltable reflector when in nominal or center position. The aspect ratio is plotted for four cases: 75 degrees by 50 degrees on-axis FOV; 60 degrees by 40 degrees on-axis FOV; 45 degrees by 30 degrees on-axis FOV; and 30 degrees by 20 degrees on-axis FOV. The aspect ratio drops from 1.5 at zero obliquity, i.e. normal incidence, to about 1.1 at 40 degrees obliquity angle.

FIG. 9B shows a zero-obliquity scanning angular area 900B and an associated inscribed rectangular FOV 902B. The zero-obliquity FOV 902B solid angle is covering most of the angular area 900B. By comparison, FIG. 9C shows a 40 degrees obliquity scanning angular area 900C and an associated inscribed rectangular FOV 902C. The FOV 902C solid angle occupies a smaller percentage of the angular area 900C, and is almost 2 times less than the zero-obliquity FOV 902B, and has a different aspect ratio. Thus, the low-obliquity coupling improves the utilization of the scanning range of the tiltable reflector, enabling wider fields of view at the same scanning range of the tiltable reflector.

Figure 10:
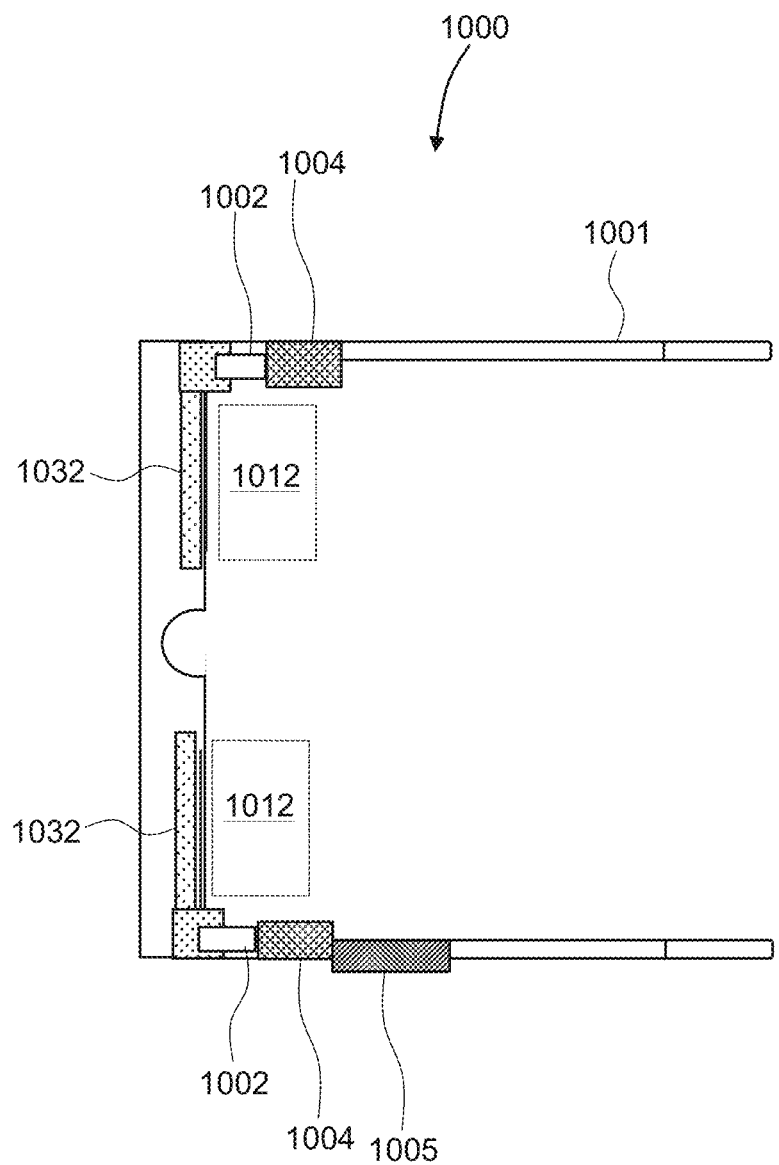
FIG. 10 is a plan cross-sectional view of a near-eye display including a beam scanner of this disclosure.

Referring to FIG. 10, a near-eye display (NED) 1000 includes a frame 1001 having a form factor of a pair of eyeglasses. The frame 1001 may support, for each eye: a projector 1002 for providing display light carrying an image in angular domain, an electronic driver 1004 operably coupled to the projector 1002 for powering the projector 1002, and a pupil replicator 1032 optically coupled to the projector 1002.

Each projector 1002 may include beam scanners and light sources described herein. The beam scanners 130 of FIG. 1, 230A of FIG. 2, 230B of FIG. 2B, 330 of FIG. 3, and/or 530 of FIG. 5 may be used as the projectors 1002. Light sources for these projectors may include a substrate supporting an array of single-mode or multimode semiconductor light sources. For example, the light sources 106 of FIG. 1, 206 of FIG. 2, 306 of FIG. 4, 506 or 556 of FIG. 5 may include side-emitting laser diodes, vertical-cavity surface-emitting laser diodes, SLEDs, or light-emitting diodes, for providing a plurality of light beams as described above with reference to FIGS. 8A, 8B, and 8C. Collimators for the light sources may include concave mirrors, bulk lenses, Fresnel lenses, holographic lenses, pancake lenses, etc. The pupil replicators 1032 may include waveguide(s) equipped with a plurality of surface relief and/or volume holographic gratings. The function of the pupil replicators 1032 is to provide multiple laterally offset copies of the display light beams provided by the projectors 1002 at respective eyeboxes 1012.

A controller 1005 is operably coupled to the light sources and tiltable reflectors of the projectors 1002. The controller 1005 may be configured to determine the X- and Y-tilt angles of the tiltable reflectors of the projectors 1002. The controller 1005 determines which pixel or pixels of the image to be displayed correspond to the determined X- and Y-tilt angles. Then, the controller 1005 determines the brightness and/or color of these pixels, and operates the electronic drivers 1004 accordingly for providing powering electric pulses to the light sources of the projectors 1002 to produce light pulses at power level(s) corresponding to the determined pixel brightness and color.

In some embodiments, the controller 1005 may be configured to operate, for each eye, tiltable reflector(s) to cause the light beam reflected from the tiltable reflectors and propagated through the respective beam-folded pupil relay to have a beam angle corresponding to a pixel of an image to be displayed. The controller 1005 may be further configured to operate the corresponding light source in coordination with operating the tiltable reflectors, such that the light beam has brightness and/or color corresponding to the pixel being displayed. In multi-light source/multi-emitter embodiments, the controller 1005 may be configured to operate the corresponding light sources/emitters in coordination, to provide a larger FOV, an improved scanning resolution, increased brightness of the display, etc. For example, in embodiment where the projectors for both of user's eyes each include two light sources, the controller 1005 may be configured to operate the tiltable reflectors to cause two light beams reflected from the tiltable reflectors and propagated through the beam-folded pupil relay to have beam angle corresponding to respective two pixels of an image to be displayed, and operate the light sources in coordination with operating the tiltable reflectors, such that the two light beams have brightness and/or color corresponding to the two respective pixels. More light sources than two may be provided, each light source including one or a plurality of emitters, for one or a plurality of color channels of the image being displayed.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
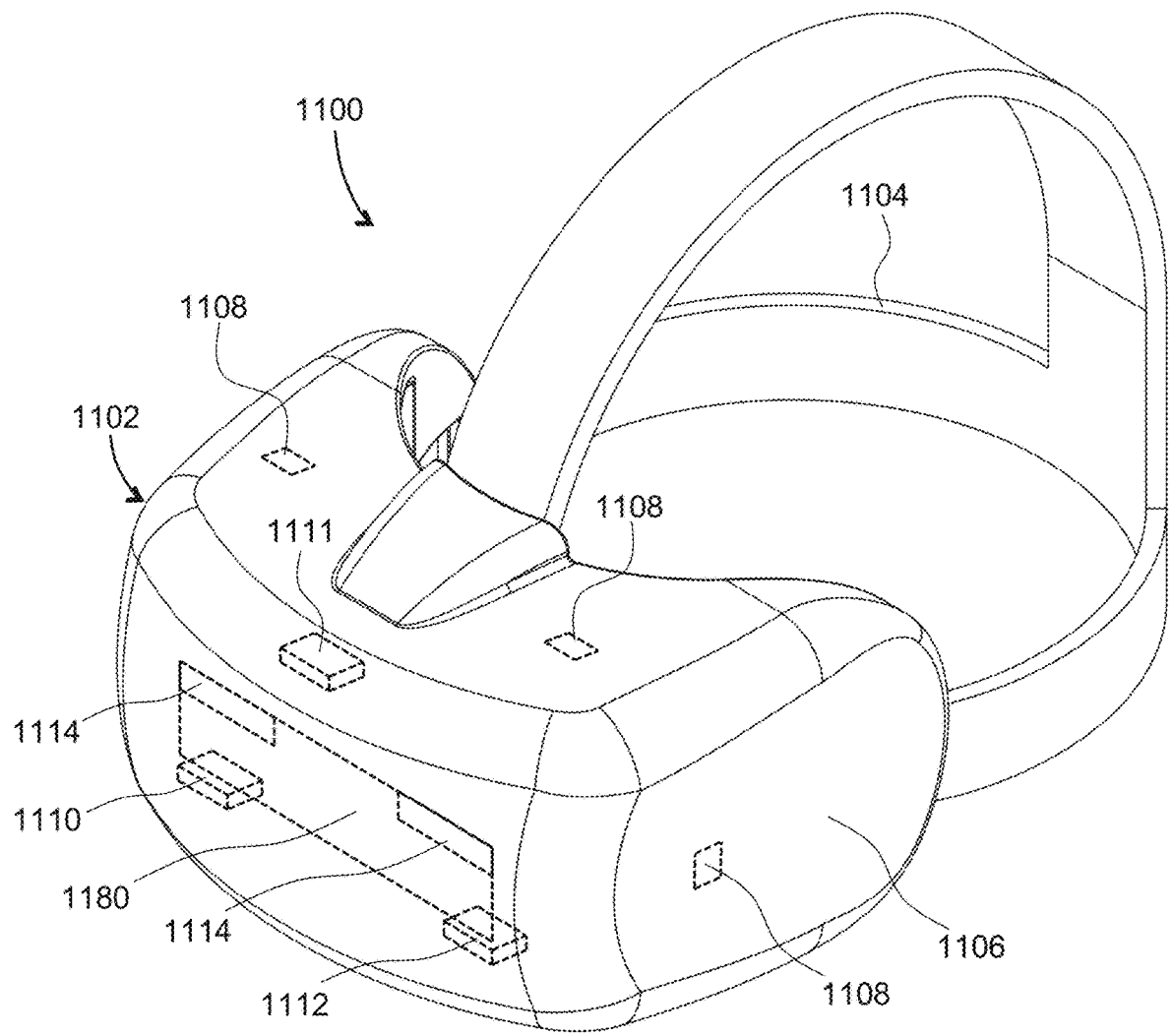
FIG. 11A is an isometric view of a head-mounted display of the present disclosure.

Referring to FIG. 11A, an HMD 1100 is an example of an AR/VR wearable display system which encloses the user's face, for a greater degree of immersion into the AR/VR environment. The HMD 1100 is an embodiment of the near-eye display 200A of FIG. 2A, 300 of FIG. 3, or the near-eye display 500 of FIG. 5, for example. The function of the HMD 1100 is to augment views of a physical, real-world environment with computer-generated imagery, and/or to generate the entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR), or a similar device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Figure 11B:
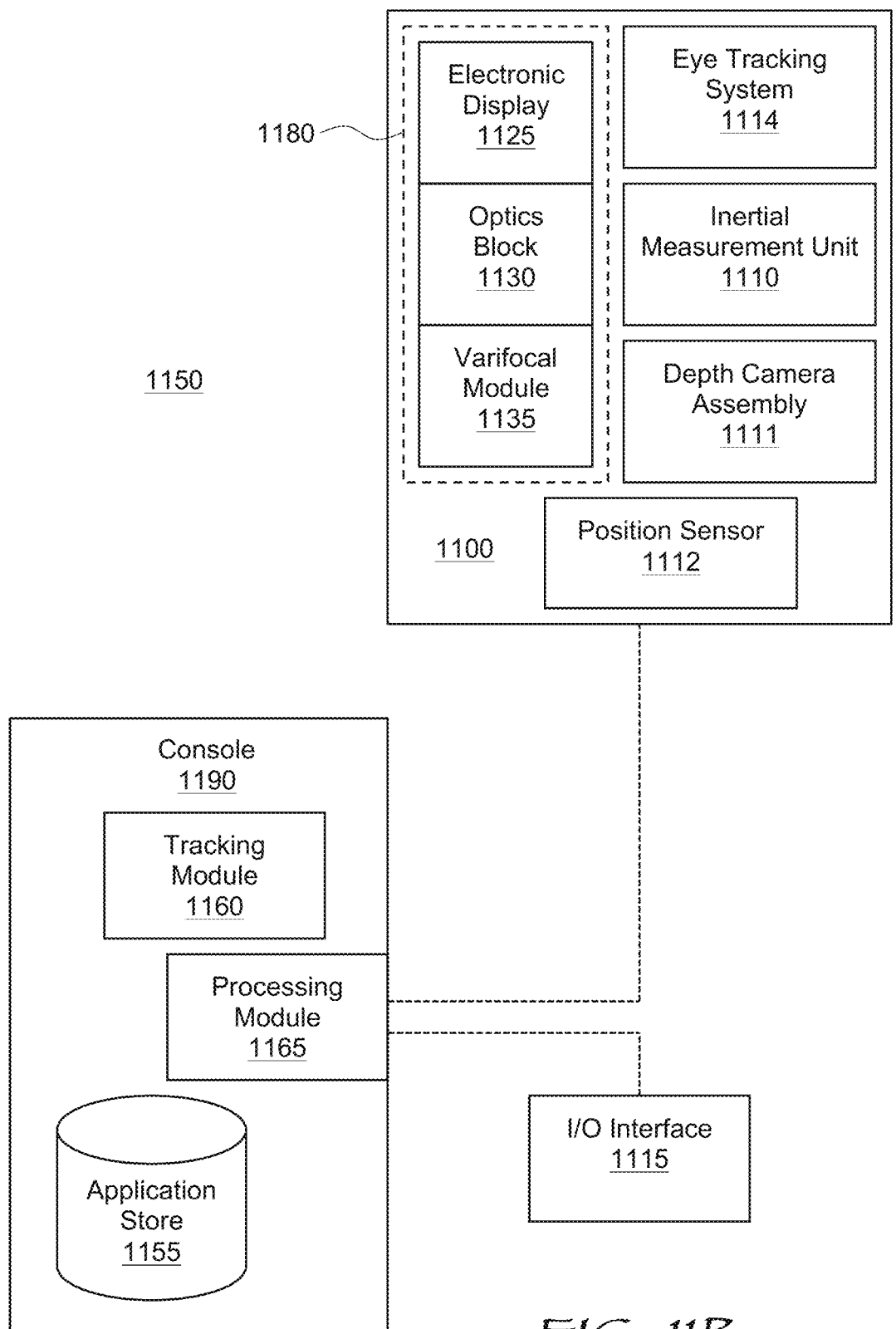
FIG. 11B is a block diagram of a virtual reality system including the headset of FIG. 11A.

Referring to FIG. 11B, an AR/VR system 1150 is an example implementation of the near-eye display 200A of FIG. 2A, 300 of FIG. 3, or the near-eye display 500 of FIG. 5. The AR/VR system 1150 includes the HMD 1100 of FIG. 11A, an external console 1190 storing various AR/VR applications, setup and calibration procedures, 3D videos, etc., and an input/output (I/O) interface 1115 for operating the console 1190 and/or interacting with the AR/VR environment. The HMD 1100 may be "tethered" to the console 1190 with a physical cable, or connected to the console 1190 via a wireless communication link such as Bluetooth®, Wi-Fi, etc. There may be multiple HMDs 1100, each having an associated I/O interface 1115, with each HMD 1100 and I/O interface(s) 1115 communicating with the console 1190. In alternative configurations, different and/or additional components may be included in the AR/VR system 1150. Additionally, functionality described in conjunction with one or more of the components shown in FIGS. 11A and 11B may be distributed among the components in a different manner than described in conjunction with FIGS. 11A and 11B in some embodiments. For example, some or all of the functionality of the console 1115 may be provided by the HMD 1100, and vice versa. The HMD 1100 may be provided with a processing module capable of achieving such functionality.

As described above with reference to FIG. 11A, the HMD 1100 may include the eye tracking system 1114 (FIG. 11B) for tracking eye position and orientation, determining gaze angle and convergence angle, etc., the IMU 1110 for determining position and orientation of the HMD 1100 in 3D space, the DCA 1111 for capturing the outside environment, the position sensor 1112 for independently determining the position of the HMD 1100, and the display system 1180 for displaying AR/VR content to the user. The display system 1180 includes (FIG. 11B) an electronic display 1125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1180 further includes an optics block 1130, whose function is to convey the images generated by the electronic display 1125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1180 may further include a varifocal module 1135, which may be a part of the optics block 1130. The function of the varifocal module 1135 is to adjust the focus of the optics block 1130 e.g. to compensate for vergence-accommodation conflict, to correct for vision defects of a particular user, to offset aberrations of the optics block 1130, etc.

The I/O interface 1115 is a device that allows a user to send action requests and receive responses from the console 1190. An action request is a request to perform a particular action. For example, an action request may be an instruction to start or end capture of image or video data or an instruction to perform a particular action within an application. The I/O interface 1115 may include one or more input devices, such as a keyboard, a mouse, a game controller, or any other suitable device for receiving action requests and communicating the action requests to the console 1190. An action request received by the I/O interface 1115 is communicated to the console 1190, which performs an action corresponding to the action request. In some embodiments, the I/O interface 1115 includes an IMU that captures calibration data indicating an estimated position of the I/O interface 1115 relative to an initial position of the I/O interface 1115. In some embodiments, the I/O interface 1115 may provide haptic feedback to the user in accordance with instructions received from the console 1190. For example, haptic feedback can be provided when an action request is received, or the console 1190 communicates instructions to the I/O interface 1115 causing the I/O interface 1115 to generate haptic feedback when the console 1190 performs an action.

The console 1190 may provide content to the HMD 1100 for processing in accordance with information received from one or more of: the IMU 1110, the DCA 1111, the eye tracking system 1114, and the I/O interface 1115. In the example shown in FIG. 11B, the console 1190 includes an application store 1155, a tracking module 1160, and a processing module 1165. Some embodiments of the console 1190 may have different modules or components than those described in conjunction with FIG. 11B. Similarly, the functions further described below may be distributed among components of the console 1190 in a different manner than described in conjunction with FIGS. 11A and 11B.

The application store 1155 may store one or more applications for execution by the console 1190. An application is a group of instructions that, when executed by a processor, generates content for presentation to the user. Content generated by an application may be in response to inputs received from the user via movement of the HMD 1100 or the I/O interface 1115. Examples of applications include: gaming applications, presentation and conferencing applications, video playback applications, or other suitable applications.

The tracking module 1160 may calibrate the AR/VR system 1150 using one or more calibration parameters and may adjust one or more calibration parameters to reduce error in determination of the position of the HMD 1100 or the I/O interface 1115. Calibration performed by the tracking module 1160 also accounts for information received from the IMU 1110 in the HMD 1100 and/or an IMU included in the I/O interface 1115, if any. Additionally, if tracking of the HMD 1100 is lost, the tracking module 1160 may re-calibrate some or all of the AR/VR system 1150.

The tracking module 1160 may track movements of the HMD 1100 or of the I/O interface 1115, the IMU 1110, or some combination thereof. For example, the tracking module 1160 may determine a position of a reference point of the HMD 1100 in a mapping of a local area based on information from the HMD 1100. The tracking module 1160 may also determine positions of the reference point of the HMD 1100 or a reference point of the I/O interface 1115 using data indicating a position of the HMD 1100 from the IMU 1110 or using data indicating a position of the I/O interface 1115 from an IMU included in the I/O interface 1115, respectively. Furthermore, in some embodiments, the tracking module 1160 may use portions of data indicating a position or the HMD 1100 from the IMU 1110 as well as representations of the local area from the DCA 1111 to predict a future location of the HMD 1100. The tracking module 1160 provides the estimated or predicted future position of the HMD 1100 or the I/O interface 1115 to the processing module 1165.

The processing module 1165 may generate a 3D mapping of the area surrounding some or all of the HMD 1100 ("local area") based on information received from the HMD 1100. In some embodiments, the processing module 1165 determines depth information for the 3D mapping of the local area based on information received from the DCA 1111 that is relevant for techniques used in computing depth. In various embodiments, the processing module 1165 may use the depth information to update a model of the local area and generate content based in part on the updated model.

The processing module 1165 executes applications within the AR/VR system 1150 and receives position information, acceleration information, velocity information, predicted future positions, or some combination thereof, of the HMD 1100 from the tracking module 1160. Based on the received information, the processing module 1165 determines content to provide to the HMD 1100 for presentation to the user. For example, if the received information indicates that the user has looked to the left, the processing module 1165 generates content for the HMD 1100 that mirrors the user's movement in a virtual environment or in an environment augmenting the local area with additional content. Additionally, the processing module 1165 performs an action within an application executing on the console 1190 in response to an action request received from the I/O interface 1115 and provides feedback to the user that the action was performed. The provided feedback may be visual or audible feedback via the HMD 1100 or haptic feedback via the I/O interface 1115.

In some embodiments, based on the eye tracking information (e.g., orientation of the user's eyes) received from the eye tracking system 1114, the processing module 1165 determines resolution of the content provided to the HMD 1100 for presentation to the user on the electronic display 1125. The processing module 1165 may provide the content to the HMD 1100 having a maximum pixel resolution on the electronic display 1125 in a foveal region of the user's gaze. The processing module 1165 may provide a lower pixel resolution in other regions of the electronic display 1125, thus lessening power consumption of the AR/VR system 1150 and saving computing resources of the console 1190 without compromising a visual experience of the user. In some embodiments, the processing module 1165 can further use the eye tracking information to adjust where objects are displayed on the electronic display 1125 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A beam scanner comprising:
   a first 1D tiltable microelectromechanical system (MEMS) reflector for receiving a first light beam from a light source and scanning the first light beam along a first direction;
   a beam-folded pupil relay configured for receiving the first light beam from the first tiltable reflector and relaying the first light beam to an exit pupil, the beam-folded pupil relay comprising:
      a beamsplitter configured for receiving the first light beam reflected by the first tiltable reflector and reflecting at least a portion of the first light beam; and
      a curved reflector configured for receiving the portion of the first light beam reflected by the beamsplitter, and for reflecting the portion of the first light beam back towards the beamsplitter, wherein the beamsplitter is configured to transmit at least a portion of the portion of the first light beam reflected by the curved reflector to the exit pupil of the beam-folded pupil relay; and
   a second 1D tiltable MEMS reflector disposed proximate the exit pupil for receiving the first light beam propagated through the beamsplitter and scanning the first light beam along a second direction non-parallel to the first direction.

2. The beam scanner of claim 1, wherein the curved reflector has a radius of curvature substantially equal to an optical path length from the first 1D tiltable MEMS reflector to the curved reflector, and to an optical path length from the curved reflector to the exit pupil.

3. The beam scanner of claim 1, wherein the beamsplitter comprises a polarization beamsplitter (PBS) configured to reflect light having a first polarization state and to transmit light having a second polarization state orthogonal to the first polarization state, wherein the first light beam reflected from the first 1D tiltable MEMS reflector and impinging onto the PBS has the first polarization state, the beam scanner further comprising:
   a first quarter-wave waveplate (QWP) disposed in an optical path between the PBS and the curved reflector and configured to convert polarization of the first light beam upon double pass through the first QWP from the first polarization state to the second polarization state, whereby in operation, the first light beam reflected by the curved reflector propagates through the PBS.

4. The beam scanner of claim 3, further comprising:
   a first lens in an optical path between the first 1D tiltable MEMS reflector and the PBS, for focusing the first light beam reflected by the first 1D tiltable MEMS reflector to propagate towards the PBS;
   a second lens in an optical path between the PBS and the exit pupil, for collimating the first light beam propagated through the PBS; and
   a second QWP in an optical path between the first 1D tiltable MEMS reflector and the PBS, wherein in operation, the first light beam emitted by the light source has the second polarization state and propagates through the PBS before impinging onto the first 1D tiltable MEMS reflector.

5. The beam scanner of claim 3, wherein the PBS has a shape of a cuboid with two square faces and four rectangular, non-square faces.

6. The beam scanner of claim 1, wherein the curved reflector comprises a meniscus lens having a reflective coating on its distal convex surface.

7. A beam scanner comprising:
   a first tiltable reflector for receiving a first light beam from a light source and reflecting the first light beam at a variable angle;
   a beam-folded pupil relay configured for receiving the first light beam from the first tiltable reflector and relaying the first light beam to an exit pupil, the beam-folded pupil relay comprising:
      a beamsplitter configured for receiving the first light beam reflected by the first tiltable reflector and reflecting at least a portion of the first light beam; and
      a curved reflector configured for receiving the portion of the first light beam reflected by the beamsplitter, and for reflecting the portion of the first light beam back towards the beamsplitter, wherein the beamsplitter is configured to transmit at least a portion of the portion of the first light beam reflected by the curved reflector to the exit pupil of the beam-folded pupil relay;
   a beam-folding prismatic element in an optical path between the first tiltable reflector and the beamsplitter, the beam-folding prismatic element comprising first and second adjacent surfaces and a first reflective polarizer at the first surface, wherein the beam-folding prismatic element is configured to reflect the first light beam emitted by the light source at least twice from within the beam-folding prismatic element, including one reflection from the first reflective polarizer, before redirecting the first light beam out of the beam-folding prismatic element through the second surface and towards the first tiltable reflector; and a QWP configured for receiving and propagating therethrough the first light beam exiting the beam-folding prismatic element, wherein in operation, the first light beam propagated through the QWP after reflection from the tiltable reflector propagates through the beam-folding prismatic element.

8. The beam scanner of claim 7, further comprising a second prismatic element for propagating therethrough the first light beam outputted by the beam-folding prismatic element, the second prismatic element adjoining the first reflective polarizer.

9. The beam scanner of claim 7, wherein the beam-folding prismatic element further comprises a second reflective polarizer disposed within the beam-folding prismatic element in an optical path of the first light beam between reflections from the second and first surfaces within the beam-folding prismatic element, and wherein the QWP is optically coupled to a third surface of the beam-folding prismatic element;

wherein in operation, the first light beam undergoes a first reflection from the second surface, propagates through the second reflective polarizer, undergoes a second reflection from the third surface through the QWP, is reflected by the first reflective polarizer, exits the beam-folding prismatic element at its third surface through the QWP, is reflected by the tiltable reflector to propagate back through the QWP, thorough the second reflective polarizer, and out of the beam-folding prismatic element.

10. The beam scanner of claim 9, further comprising a second prismatic element coupled to the first surface of the beam-folding prismatic element, for receiving a second light beam impinging on the second prismatic element, and for coupling the second light beam to the beam-folding prismatic element through the first reflective polarizer.

11. A projector comprising:
a first light source for providing a first light beam;
a first 1D tiltable microelectromechanical system (MEMS) reflector for receiving the first light beam from the light source and scanning the first light beam along a first direction; and
a beam-folded pupil relay configured for receiving the first light beam from the first tiltable reflector and relaying the first light beam to an exit pupil, the beam-folded pupil relay comprising:
a beamsplitter configured for receiving the first light beam reflected by the first tiltable reflector and reflecting at least a portion of the first light beam; and
a curved reflector configured for receiving the portion of the first light beam reflected by the beamsplitter, and for reflecting the portion of the first light beam back towards the beamsplitter, wherein the beamsplitter is configured to transmit at least a portion of the portion of the first light beam reflected by the curved reflector to the exit pupil of the beam-folded pupil relay; and
a second 1D tiltable MEMS reflector disposed proximate the exit pupil for receiving the first light beam propagated through the beamsplitter and scanning the first light beam along a second direction non-parallel to the first direction.

12. The projector of claim 11, wherein the beamsplitter comprises a polarization beamsplitter (PBS) configured to reflect light having a first polarization state and to transmit light having a second polarization state orthogonal to the first polarization state, wherein the first light beam reflected from the tiltable reflector and impinging onto the PBS has the first polarization state, the projector further comprising:

a first lens in an optical path between the first tiltable reflector and the PBS, for focusing the first light beam reflected by the first tiltable reflector to propagate towards the PBS;

a second lens in an optical path between the PBS and the exit pupil, for collimating the first light beam propagated through the PBS;

a first quarter-wave waveplate (QWP) disposed in an optical path between the PBS and the curved reflector and configured to convert polarization of the first light beam upon double pass through the first QWP from the first polarization state to the second polarization state, whereby in operation, the first light beam reflected by the curved reflector propagates through the PBS; and a second QWP in an optical path between the first tiltable reflector and the PBS, wherein in operation, the first light beam emitted by the light source has the second polarization state and propagates through the PBS before impinging onto the first tiltable reflector.

13. A projector comprising:
a first light source for providing a first light beam;
a first tiltable reflector for receiving the first light beam from the light source and reflecting the first light beam at a variable angle; and
a beam-folded pupil relay configured for receiving the first light beam from the first tiltable reflector and relaying the first light beam to an exit pupil, the beam-folded pupil relay comprising:
a beamsplitter configured for receiving the first light beam reflected by the first tiltable reflector and reflecting at least a portion of the first light beam;
a curved reflector configured for receiving the portion of the first light beam reflected by the beamsplitter, and for reflecting the portion of the first light beam back towards the beamsplitter, wherein the beamsplitter is configured to transmit at least a portion of the portion of the first light beam reflected by the curved reflector to the exit pupil of the beam-folded pupil relay;
a beam-folding prismatic element in an optical path between the first tiltable reflector and the beamsplitter, the beam-folding prismatic element comprising first and second adjacent surfaces and a first reflective polarizer at the first surface, wherein the beam-folding prismatic element is configured to reflect the first light beam emitted by the light source at least twice from within the beam-folding prismatic element, including one reflection from the first reflective polarizer, before redirecting the first light beam out of the beam-folding prismatic element through the second surface and towards the first tiltable reflector; and
a QWP configured for receiving and propagating therethrough the first light beam exiting the beam-folding prismatic element, wherein in operation, the first light beam propagated through the QWP after reflection from the tiltable reflector propagates through the beam-folding prismatic element.

14. The projector of claim 13, further comprising:
a second light source for providing a second light beam;
a second prismatic element coupled to the first surface of the beam-folding prismatic element, for receiving the second light beam impinging on the second prismatic element, and for coupling the second light beam to the beam-folding prismatic element through the first reflective polarizer;

wherein the beam-folding prismatic element further comprises a second reflective polarizer disposed within the beam-folding prismatic element in an optical path of the first light beam between reflections from the second and first surfaces within the beam-folding prismatic element, and wherein the QWP is optically coupled to a third surface of the beam-folding prismatic element;

wherein in operation, the first light beam undergoes a first reflection from the second surface, propagates through the second reflective polarizer, undergoes a second reflection from the third surface through the QWP, is reflected by the first reflective polarizer, exits the beam-folding prismatic element at its third surface through the QWP, is reflected by the tiltable reflector to propagate back through the QWP, thorough the second reflective polarizer, and out of the beam-folding prismatic element.

15. A near-eye display for providing an image in angular domain at an eyebox, the near-eye display comprising:
a first light source for providing a first light beam;
a first 1D tiltable microelectromechanical system (MEMS) reflector for receiving the first light beam from the light source and scanning the first light beam along a first direction; and
a beam-folded pupil relay configured for receiving the first light beam from the first tiltable reflector and relaying the first light beam to an exit pupil, the beam-folded pupil relay comprising:
 a beamsplitter configured for receiving the first light beam reflected by the first tiltable reflector and reflecting at least a portion of the first light beam; and
 a curved reflector configured for receiving the portion of the first light beam reflected by the beamsplitter, and for reflecting the portion of the first light beam back towards the beamsplitter wherein the beamsplitter is configured to transmit at least a portion of the portion of the first light beam reflected by the curved reflector to the exit pupil of the beam-folded pupil relay;
a second 1D tiltable MEMS reflector disposed proximate the exit pupil for receiving the first light beam propagated through the beamsplitter and scanning the first light beam along a second direction non-parallel to the first direction;
a pupil-replicating waveguide disposed proximate the exit pupil of the beam-folded pupil relay; and
a controller operably coupled to the first light source and the first tiltable reflector and configured to:
 operate the first tiltable reflector to cause the portion of the portion of the first light beam at the exit pupil of the beam-folded pupil relay to have a beam angle corresponding to a first pixel of an image to be displayed; and
 operate the first light source in coordination with operating the tiltable reflector, such that the first light beam has brightness corresponding to the first pixel.

16. The near-eye display of claim 15,
wherein the pupil-replicating waveguide comprises a polarization volume grating (PVH) configured to receive the light beam reflected by the second tiltable reflector and redirect the light beam for propagation in the pupil-replicating waveguide; and
wherein the controller is operably coupled to the second tiltable reflector and configured to operate the second tiltable reflector to cause the first light beam at the exit pupil of the beam-folded pupil relay to have a beam angle corresponding to the first pixel of an image to be displayed.

17. A near-eye display for providing an image in angular domain at an eyebox, the near-eye display comprising:
a first light source for providing a first light beam;
a first tiltable reflector for receiving the first light beam from the light source and reflecting the first light beam at a variable angle; and
a beam-folded pupil relay configured for receiving the first light beam from the first tiltable reflector and relaying the first light beam to an exit pupil, the beam-folded pupil relay comprising:
a beamsplitter configured for receiving the first light beam reflected by the first tiltable reflector and reflecting at least a portion of the first light beam; and
a curved reflector configured for receiving the portion of the first light beam reflected by the beamsplitter, and for reflecting the portion of the first light beam back towards the beamsplitter, wherein the beamsplitter is configured to transmit at least a portion of the portion of the first light beam reflected by the curved reflector to the exit pupil of the beam-folded pupil relay;
a pupil-replicating waveguide disposed proximate the exit pupil of the beam-folded pupil relay; and
a controller operably coupled to the first light source and the first tiltable reflector and configured to:
 operate the first tiltable reflector to cause the portion of the portion of the first light beam at the exit pupil of the beam-folded pupil relay to have a beam angle corresponding to a first pixel of an image to be displayed; and
 operate the first light source in coordination with operating the tiltable reflector, such that the first light beam has brightness corresponding to the first pixel;
a beam-folding prismatic element in an optical path between the first tiltable reflector and the beamsplitter, the beam-folding prismatic element comprising first and second adjacent surfaces and a first reflective polarizer at the first surface, wherein the beam-folding prismatic element is configured to reflect the first light beam emitted by the light source at least twice from within the beam-folding prismatic element, including one reflection from the first reflective polarizer, before redirecting the first light beam out of the beam-folding prismatic element through the second surface and towards the first tiltable reflector; and
a QWP configured for receiving and propagating therethrough the first light beam exiting the beam-folding prismatic element, wherein in operation, the first light beam propagated through the QWP after reflection from the tiltable reflector propagates through the beam-folding prismatic element.

* * * * *